US012028530B2

(12) United States Patent
Liu et al.

(10) Patent No.: US 12,028,530 B2
(45) Date of Patent: Jul. 2, 2024

(54) ADAPTIVE TRANSCODING OF PROFILE LADDER FOR VIDEOS

(71) Applicant: HULU, LLC, Santa Monica, CA (US)

(72) Inventors: Chen Liu, Beijing (CN); Wenhao Zhang, Beijing (CN); Xuchang Huangfu, Beijing (CN); Xiaobo Liu, Beijing (CN); Deliang Fu, Beijing (CN); Lan Xie, Beijing (CN); Rui Zhang, Beijing (CN); Shuai Lou, Beijing (CN); Chao Zhang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 17/649,712

(22) Filed: Feb. 2, 2022

(65) Prior Publication Data
US 2022/0159268 A1    May 19, 2022

Related U.S. Application Data

(63) Continuation of application No. 17/085,589, filed on Oct. 30, 2020, now Pat. No. 11,277,620.

(51) Int. Cl.
*H04N 19/147*    (2014.01)
*H04N 19/115*    (2014.01)
(Continued)

(52) U.S. Cl.
CPC ......... *H04N 19/147* (2014.11); *H04N 19/115* (2014.11); *H04N 19/166* (2014.11); *H04N 19/184* (2014.11)

(58) Field of Classification Search
CPC .. H04N 19/147; H04N 19/115; H04N 19/166; H04N 19/184; H04N 19/136;
(Continued)

(56) References Cited

U.S. PATENT DOCUMENTS 10,616,590 B1    4/2020    Wei et al.
10,958,947 B1 *  3/2021    Wei ..................... H04N 21/236
(Continued)

FOREIGN PATENT DOCUMENTS

EP          3993419 A1     5/2022
WO       2014146193 A1     9/2014
WO       2015171355 A1    11/2015

OTHER PUBLICATIONS

Indian Application Serial No. 202144047698, Office Action mailed May 27, 2022, 5 pgs.
(Continued)

*Primary Examiner* — Tracy Y. Li
(74) *Attorney, Agent, or Firm* — Kwan & Olynick LLP

(57) ABSTRACT

In some embodiments, a method analyzes content of a video to generate a representation for a video that represents a relationship of a bitrate to a quality measurement for the video. A plurality of candidate points on the representation are selected. Then, the method selects a profile ladder from at least a portion of the plurality of candidate points. Each profile in the profile ladder is associated with a candidate point and the profile includes a corresponding bitrate and a quality measurement for the respective candidate point. The profile ladder is used for the video.

20 Claims, 15 Drawing Sheets

(51) Int. Cl.
*H04N 19/166* (2014.01)
*H04N 19/184* (2014.01)

(58) Field of Classification Search
CPC ........... H04N 21/23439; H04N 19/196; H04N 19/40; H04N 21/23418; H04N 21/2402; H04N 21/63; H04N 21/643; H04N 21/647; H04N 21/845; H04N 19/423; H04L 67/06; H04L 67/30

See application file for complete search history.

(56) References Cited

U.S. PATENT DOCUMENTS

| | | | |
|---|---|---|---|
| 11,115,697 B1* | 9/2021 | Nandakumar | H04N 21/25825 |
| 11,190,826 B1* | 11/2021 | Labrozzi | H04N 21/234345 |
| 11,277,620 B1 | 3/2022 | Liu et al. | |
| 11,489,899 B1* | 11/2022 | Giladi | H04L 65/75 |
| 2007/0002946 A1 | 1/2007 | Bouton et al. | |
| 2014/0269907 A1 | 9/2014 | Joset et al. | |
| 2016/0007050 A1 | 1/2016 | Rusert et al. | |
| 2016/0014421 A1 | 1/2016 | Cote et al. | |
| 2016/0037176 A1 | 2/2016 | Chari | |
| 2016/0295216 A1 | 10/2016 | Aaron et al. | |
| 2017/0061227 A1 | 3/2017 | Sharma et al. | |
| 2018/0160161 A1* | 6/2018 | Reznik | H04N 21/23439 |
| 2018/0240502 A1 | 8/2018 | Katsavounidis | |
| 2020/0221141 A1 | 7/2020 | Katsavounidis | |
| 2020/0236372 A1* | 7/2020 | Reznik | H04N 19/196 |
| 2020/0296362 A1 | 9/2020 | Chadwick et al. | |
| 2021/0368182 A1* | 11/2021 | Pandit | H04N 21/23439 |

OTHER PUBLICATIONS

European Application Serial No. 21205367.2, Search Report mailed Mar. 22, 2022, 9 pgs.
Japanese Office Action, Application No. 2021-177581, Dated Feb. 7, 2023, EN Translation, 10 pages.
European Office Action, EP Application No. 21205367.2, dated Jul. 25, 2023, 4 pages.
European Office Action, EP Application No. 21205367.2, dated Nov. 28, 2023, 5 pages.
Chinese Office Action, CN Application No. 2021112699159, dated Dec. 26, 2023, with English Translation, 25 pages.
Chinese Search Report, CN Application No. 2021112699159, dated Dec. 24, 2023, 4 pages.

* cited by examiner

ADAPTIVE TRANSCODING OF PROFILE LADDER FOR VIDEOS

CROSS REFERENCE TO RELATED APPLICATIONS

This application is a continuation application and, pursuant to 35 U.S.C. § 120, is entitled to and claims the benefit of earlier filed application U.S. application Ser. No. 17/085,589 filed Oct. 30, 2020, the content of which is incorporated herein by reference in its entirety for all purposes.

BACKGROUND

A profile ladder lists different profiles that are available for a client to use when streaming segments of a video. Each profile may be associated with different levels of video attributes, such as different levels of bitrate and/or quality. A video delivery system would like to provide clients with a video profile that has a higher bitrate when good network conditions are being experienced, which improves the quality of the video being streamed. When bad network conditions are being experienced, the video delivery system would like to provide clients with a profile with a lower bitrate such that the clients can play the video without any playback issues, such as rebuffering or downloading failures. Accordingly, when network conditions are good, it is desirable to have a profile that a client can request at the available bitrate to improve quality. Conversely, when network conditions deteriorate, it is important to have a profile at a lower bitrate so that playback issues do not occur.

A company may use a static profile ladder for all videos. This may simplify the transcoding process. However, using the same profile ladder for all videos may not provide optimal playback conditions because videos may include different characteristics that may result in different transcoding results. Also, clients may experience different playback conditions, which affects which profiles the clients select. Accordingly, a static profile ladder may not optimize the playback experience for the videos.

BRIEF DESCRIPTION OF THE DRAWINGS

With respect to the discussion to follow and in particular to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a video streaming system. In the following description, for purposes of explanation, numerous examples and specific details are set forth to provide a thorough understanding of some embodiments. Some embodiments as defined by the claims may include some or all of the features in these examples alone or in combination with other features described below and may further include modifications and equivalents of the features and concepts described herein.

A video delivery system may generate an adaptive profile ladder for videos. In some embodiments, the adaptive profile ladder may be generated for a specific video (or groups of videos) based on characteristics, such as analysis of the content of a respective video and/or an analysis of historical playback information. The video delivery system may output an adaptive profile ladder that may include profiles for different combinations of playback characteristics, such as bitrate and/or quality. Then, the adaptive profile ladder may be used in a transcoding process for the video. For example, a transcoder may use the adaptive profile ladder to transcode the video based on the profiles that are found in the adaptive profile ladder. In some examples, the transcoder uses the characteristics (e.g., the bitrate and quality) of each profile to transcode video streams. Using the adaptive profile ladders may generate different profiles for different videos. The respective profiles for respective videos may be optimized for playback of each respective video. In other embodiments, a transcoder may generate multiple video streams for a standard fixed set of profiles. Then, the adaptive profile ladder is used to select some of the profiles for the video. In either case, the adaptive profile ladder may be optimized for the respective video based on the content of the video and/or the historical playback information.

The adaptive profile ladder may use profiles that may optimize the playback experience. For example, the profiles that are created may reduce the amount of rebuffering at client devices and also provide profiles that optimize the bitrate and/or quality of the video being streamed to the client device during good network conditions. Rebuffering is reduced because the profiles used in the profile ladder may include bitrates that are low enough to allow a client device to select the profiles when network conditions with lower bandwidths are experienced. When network conditions with higher bandwidths are experienced, the profiles in the profile ladder allow the client device to select profiles with higher bitrates and/or quality levels that match the available bandwidth.

System Overview

Figure 1:
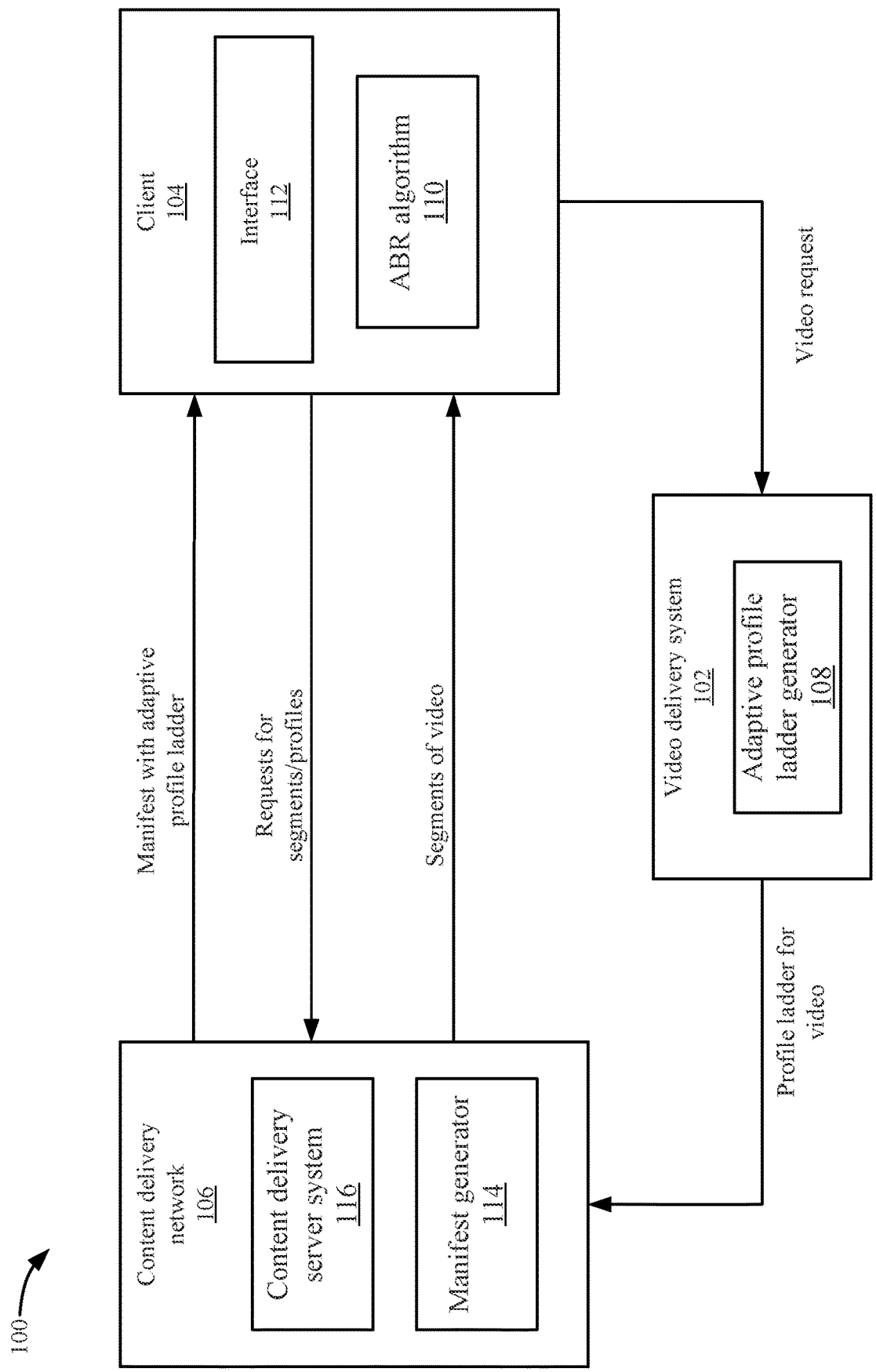
FIG. 1 depicts a simplified system for generating an adaptive profile ladder according to some embodiments.

FIG. 1 depicts a simplified system 100 for generating an adaptive profile ladder according to some embodiments. System 100 includes a video delivery system 102, a client 104, and a content delivery network 106. Video delivery system 102, content delivery network 106, and client 104 may be implemented using one or more computing devices. Also, although single instances of video delivery system 102, content delivery network 106, and client 104 are shown, it will be understood that system 100 may include more than one video delivery system 102, content delivery network 106, and/or client 104. For instance, video delivery system 102 may communicate with multiple clients 104, and content delivery network 106 may send videos to clients 104 via multiple servers, etc. Also, even though video delivery system 102, content delivery network 106, and client 104 are shown as separate entities, the functions performed by them may be distributed between them or to other entities.

Video delivery system 102 may provide a video delivery service that allows client 104 to request videos, such as videos on-demand or live videos from live television. Video delivery system 102 may provide an application that is displayed in an interface 112 at client 104. A user account may log onto the application to access the video delivery service. Then, video delivery system 102 may receive a video request from client 104 and process the video request to allow client 104 to stream the video.

Client 104 may include a computing device that can playback a video in interface 112, such as via a media player (not shown). Client 104 may include a mobile phone, smartphone, set top box, television, living room device, tablet device, etc. Clients 104 may operate on a platform, which may be classified by a type of device that operates on the platform. For example, platforms include mobile device platforms, living room device platforms, etc. A user account that is used by a user may use client 104 to access the video delivery service. For example, the user account may log in to the video delivery service to identify information for the user account. When client 104 receives a request for a video from the user account, client 104 may send the video request to video delivery system 102 for that video.

Content delivery network 106 includes servers that can deliver a video to client 104. For example, a content delivery server system 116 may include one or more servers that can deliver the video to client 104. In some embodiments, content delivery server system 116 delivers segments of video to client 104. The segments may be a portion of the video, such as six seconds of the video. As is known, a video may be encoded in multiple profiles that correspond to different levels, which may be different levels of bitrates and/or quality. Client 104 may request a segment of video from one of the profile levels based on current playback conditions. For example, client 104 may use an adaptive bitrate algorithm to select the profile for the video based on the current available bandwidth and other network conditions.

In the process to start playback of a video, video delivery system 102 may receive the request for the video from client 104. Video delivery system 102 may select a content delivery network 106 and provide the information to content delivery network 106 and/or client 104 to allow the video to be streamed between content delivery network 106 and client 104. Video delivery system 102 may also provide different information, such as a playback configuration and a media presentation description. The playback configuration may include available protocols for streaming, etc. The media presentation description may include information on profiles that are available, segment duration, and other characteristics of the video.

Content delivery network 106 may receive the video request and the profile ladder that reflects the adaptive profile ladder for the video. A manifest generator 114 may generate the manifest for client 104. The manifest may list information for segments of video that can be requested by client 104 and any other information required to playback the segments of video. The information may include links that client 104 may use to request a segment for playback. In some embodiments, the manifest lists all the available profiles for each segment, such as the manifest includes a link for each profile per segment. Client 104 can select one of the links to request playback of a segment.

When client 104 receives the manifest, client 104 can send requests for segments that are associated with a profile. For example, client 104 may select a link for a segment that is associated with a desired bitrate. Content delivery server system 116 may then send the segment of video for the requested profile to client 104, which can then display the segments in the media player on interface 112. Client 104 may change the profiles requested for segments based on current network conditions.

It is possible that the network conditions may change during the session. To adapt to the changing network conditions, an adaptive bitrate (ABR) algorithm 110 may analyze the current network conditions (e.g., available bandwidth) being experienced at client 104 and determine if a new profile ladder should be requested. For example, adaptive bitrate algorithm 110 may request a profile with a higher bitrate when available bandwidth increases and may request a profile with a lower bitrate when available bandwidth decreases.

An adaptive profile ladder generator 108 adaptively generates profiles for a profile ladder for a video. For example, adaptive profile ladder generator 108 may analyze characteristics of the content of the video and/or historical playback information to adaptively generate a profile ladder for the video. The adaptive generation may generate a different profile ladder for different characteristics of the content of the video and/or historical playback information, which may result in different profile ladders for different videos.

The profile ladder includes profiles that can be used for a video. The profiles include different levels that are associated with a characteristic, such as a bitrate and/or quality characteristic. The bitrate may be the number of bits per second that can be sent, and the quality characteristic may measure the quality of a video. A resolution of the video may be related to the quality characteristic, such as a higher resolution is associated with a higher quality. The level of a profile in the profile ladder may be determined based on how the video is transcoded for that level, such as a video may be transcoded at 400 kilobytes per second (Kbps) and a resolution of 270p. The resolution of 270p may represent a number of pixels that is used in the resolution of the video.

Adaptive profile ladder generator 108 outputs the adaptive profile ladder, which can be used to select video streams for the video. For example, the adaptive profile ladder may be used to transcode the video into respective video streams. A transcoder receives the bitrate and/or quality values for the profiles in the adaptive profile ladder and transcodes the video based on those values. The transcoder may output different video streams based on the bitrate and quality level of each profile level in the adaptive profile ladder. Also, in other examples, a transcoder may first generate a standard mix of already transcoded video streams. Then, video delivery system 102 selects profiles from the profiles output by the transcoder based on the bitrate and the quality level for profiles in the adaptive profile ladder. For example, video delivery system 102 may select profiles for video streams that have characteristics that may be closest to the characteristics of the profiles in the adaptive profile ladder.

Video delivery system 102 provides the adaptive profile ladder and the video streams for the video to content delivery network 106 and/or client 104. Client 104 can then use the adaptive profile ladder to select profiles during playback of the video. For example, adaptive bitrate algorithm 110 analyzes the network conditions and selects profiles from the adaptive profile ladder. For example, when available bandwidth is high, ABR algorithm 110 selects a profile with a higher bitrate and/or quality level, and is provided a corresponding video stream at the higher bitrate and/or quality level. When network conditions are bad, ABR algorithm 110 selects a profile with a lower bitrate and/or quality level, and is provided a corresponding video stream at the lower bitrate and/or quality level.

Transcoding Process for Adaptive Profile Ladder Generation

Figure 2:
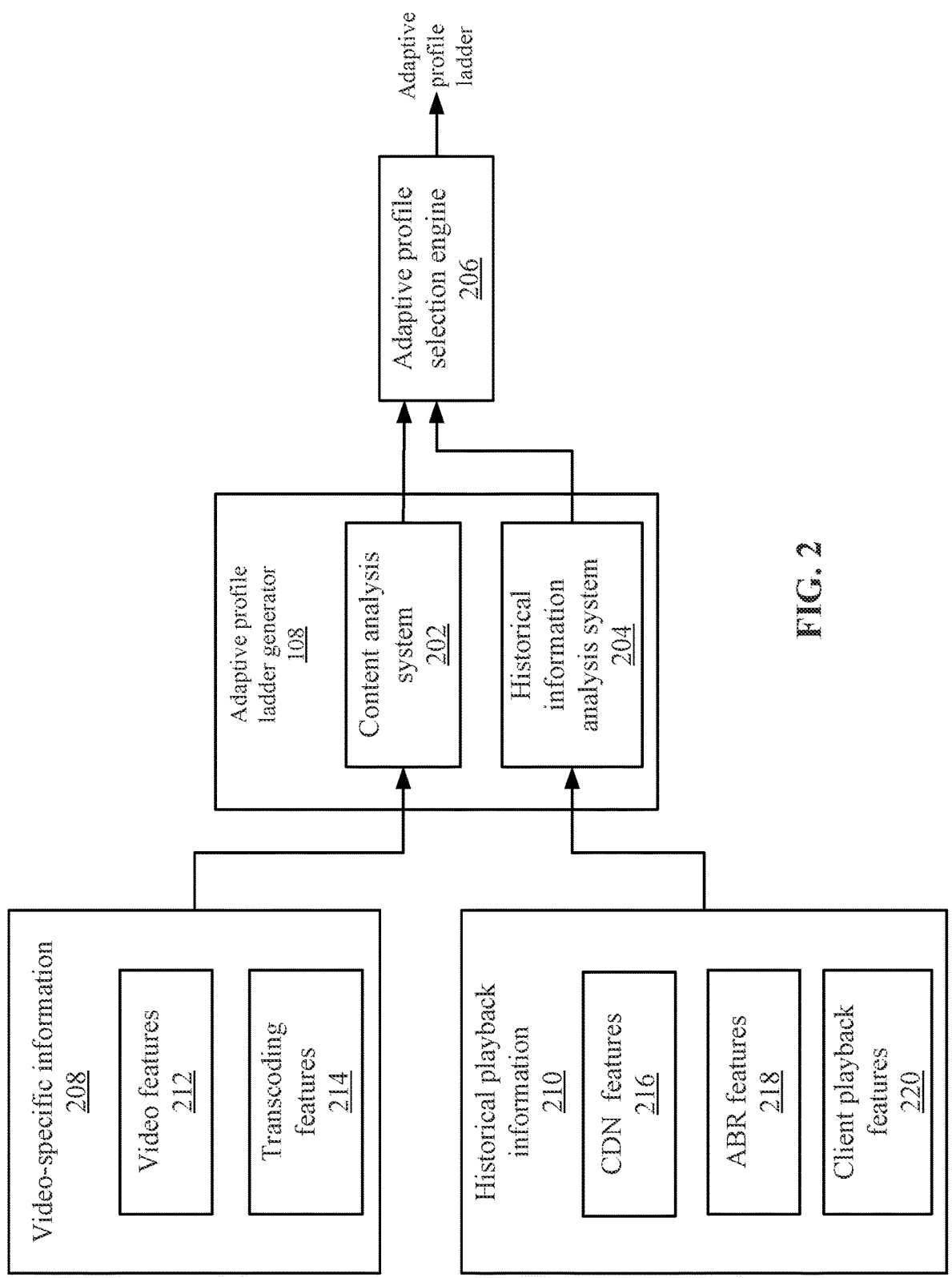
FIG. 2 depicts a more detailed example of an adaptive profile ladder generator according to some embodiments.

FIG. 2 depicts a more detailed example of adaptive profile ladder generator 108 according to some embodiments. Adaptive profile ladder generator 108 includes a content analysis system 202 and a historical information analysis system 204. Content analysis system 202 may analyze video-specific information 208, which may be information from content specific to a current video (e.g., the video in which an adaptive profile ladder is currently being generated). Also, content specific to other video or videos may be used, such as episodes of videos from the same show. Historical information analysis system 204 may analyze historical playback information 210, which may be information based on the historical playback of videos. The videos may be playback information from the video in which the adaptive profile ladder is being generated or from other videos. When information from the specific video in which the adaptive profile ladder is being generated is used, the video may be transcoded, played back, and then the information for the playback may be used to generate an adaptive profile ladder. Then, the adaptive profile ladder is used to re-transcode the video or select a new profile ladder for the video. The playback information from other videos may be selected from related videos, such as from videos of other episodes or related movies. Also, the playback information may be selected from random videos.

Video-specific information 208 includes video features 212 and transcoding features 214, but other video-specific information may also be appreciated. Video features 212 may include features derived from the content of the video, such as luminance, scenario, subject, texture, motion, complexity, etc. The luminance describes lighting conditions of the video, the scenario describes information about a shot or scene of the video (e.g., where the shot happened), the subject may be the genre of the video (e.g., cartoon, drama, etc.), the texture may be information about the spatial arrangement of an image (e.g., color, intensities, etc.), the motion may be information about motion found in the video, and complexity may measure the amount of information in the video (e.g., objects, motion, etc.). Other features may also be used. Transcoding features 214 may include features based on transcoding the video, such as a bitrate, quality metric, a quantization parameter, coding complexity, etc. Transcoding features 214 may be determined by analyzing the video before transcoding the video. The analysis may be a pre-analysis that may not be based on a full transcoding of the video. The pre-analysis may be faster than fully transcoding the video. Alternatively, transcoding features 214 may be from the full transcoding of the video or from another video (e.g., another episode of a show).

Historical playback information 210 may include CDN features 216, adaptive bitrate features 218, and client playback features 220, but other features may be used. CDN features 216 may be information associated with the delivery of videos using a content delivery network, such as which content delivery networks were used, which profiles were selected, etc. ABR features 218 may be information from adaptive bitrate algorithm 110 during the playback of videos. For example, ABR features 218 may include the profiles that are requested for videos and available bandwidth that is experienced during playback. Client playback features 220 may include the device type, the features of the device, etc. Historical playback information 210 may be collected before the adaptive profile ladder is generated and may be based on videos other than the video in which the adaptive profile ladder is being generated. However, historical playback information 210 may include historical playback information for the video in which the adaptive profile ladder is being generated.

Content analysis system 202 analyzes the content and outputs information about video-specific information 208. Historical information analysis system 204 analyzes historical playback information 210 and outputs information about historical playback information 210. An adaptive profile selection engine 206 then uses the information to select an adaptive profile ladder for the video based on the content and historical playback information. Examples of the process to select the adaptive profile ladder using the analyzed content and the historical playback information are described below.

Figure 3:
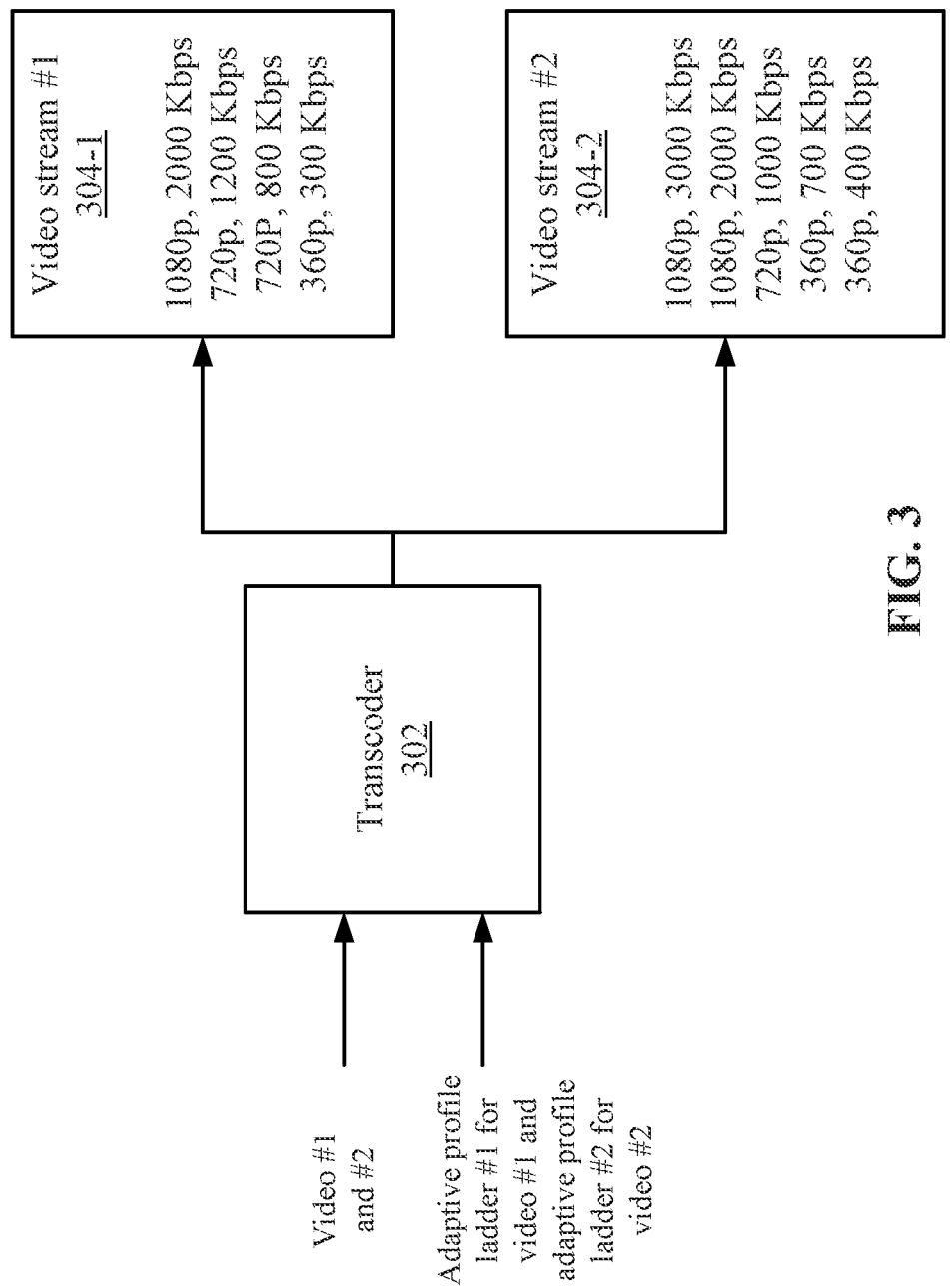
FIG. 3 depicts an example of using the adaptive profile ladder during the transcoding process according to some embodiments.

As discussed above, the adaptive profile ladder may be used in a transcoding process of a video or after the transcoding process of a video. FIG. 3 depicts an example of using the adaptive profile ladder during the transcoding process according to some embodiments. Transcoder 302 transcodes videos into video streams for a video using different characteristics. For example, transcoder 302 may transcode a video into different video streams based on different settings, such as different bitrates and quality levels.

Figure 4:
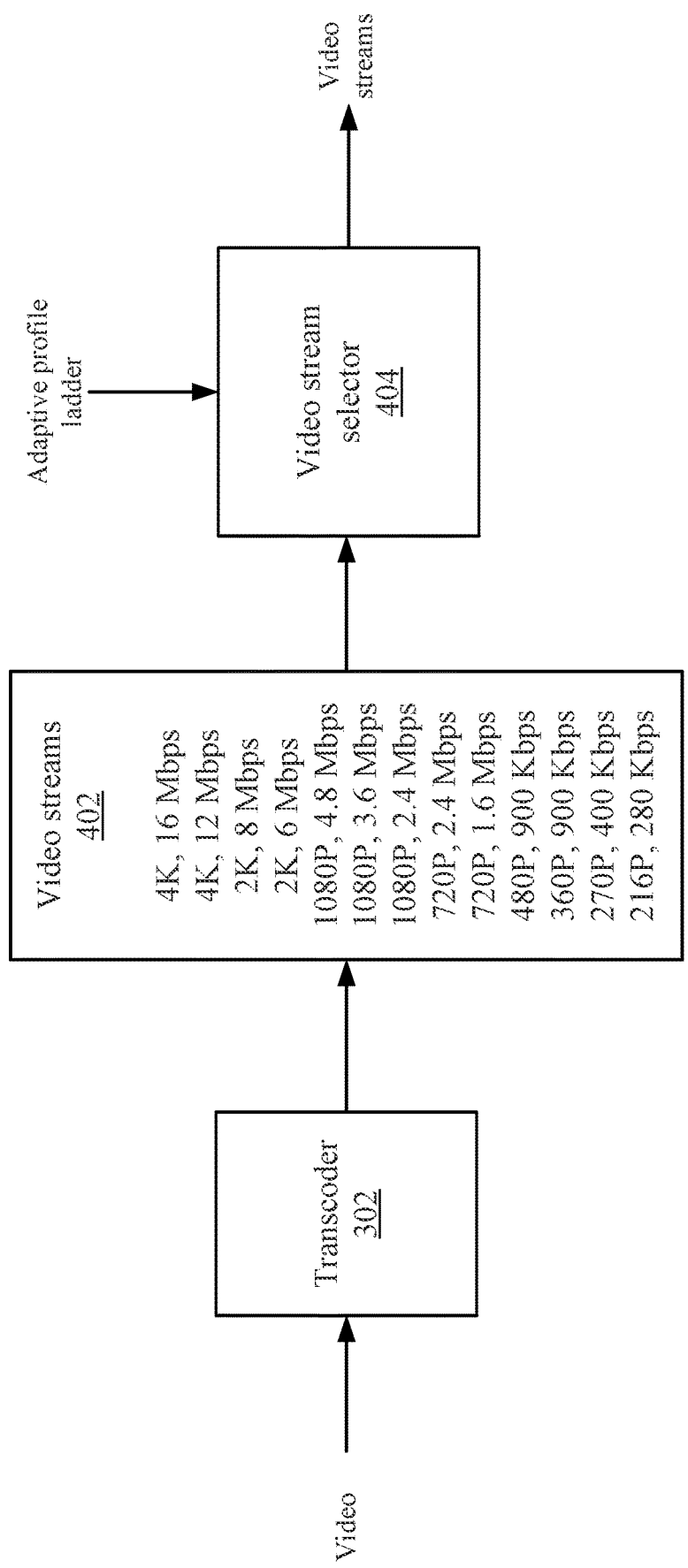
FIG. 4 depicts an example of generating the video streams for a video after trans coding according to some embodiments.

Transcoder 302 receives a video and the adaptive profile ladder. The adaptive profile ladder may specify different bitrates and quality levels for profiles. Transcoder 302 may then generate a video stream for each profile in the adaptive profile ladder and outputs video streams 304. Each video stream 304 may include different characteristics, such as different bitrates and quality (e.g., resolutions). In some embodiments, transcoder 302 receives a video #1 and a video #2, and respective profile ladders #1 and #2 for the respective videos. Transcoder 302 generates videos streams 304 according to the respective profile ladders for each video. For example, a static profile ladder may include the profiles of (360p, 500 Kbps), (360p, 1000 Kbps), (720p, 1500 Kbps), (720p, 2500 Kbps), (1080, 4000 Kbps). Then, an adaptive profile ladder for a video #1 may be (360p, 300 Kbps), (720p, 800 Kbps), (720p, 1200 Kbps), (1080p, 2000 Kbps). Also, an adaptive profile ladder for a video #2 may be: (360p, 400 Kbps), (360p, 700 Kbps), (720p, 1000 Kbps), (1080p, 2000 Kbps), (1080p, 3000 Kbps). The adaptive profile ladder may select any bitrate and resolution, and may include different numbers of profiles. Also, the adaptive profile ladder may select a subset of profiles that are available from a static ladder. From the example above, the adaptive profile from video #1 and video #2 different from each other, and also from the static profile ladder. Video stream #1 304-1 includes video streams transcoded using adaptive profile ladder #1 and video streams #2 304-2 includes video streams transcoded using adaptive profile ladder #2, Also, the adaptive profile ladder may be generated after the transcoding of a video according to some embodiments. FIG. 4 depicts an example of generating the video streams for a video after transcoding according to some embodiments. Transcoder 302 receives a video and transcodes the video into video streams 402. Video streams 402 may include different quality levels and bitrates. For example, video streams 402 may be associated with a standard fixed number of profiles that may possibly be used, but not all of the profiles are included in a profile ladder. That is, the number of video streams 402 is greater than the number of profiles in the adaptive profile ladder.

A video stream selector 404 receives the adaptive profile ladder and selects some video streams 402. For example, video stream selector 404 uses the bitrate and/or quality level of profiles in adaptive profile ladder 108 to select video streams from video streams 402. In some embodiments, video stream selector 404 selects a video stream from video streams 402 that has a bitrate and/or a quality level closest to the bitrate and quality level for each profile in the adaptive profile ladder. In some embodiments, the video streams may not have been transcoded exactly for the bitrate and/or quality level of the profiles in adaptive profile ladder 108. However, the profiles may include a bitrate and/or quality level that is close to the bitrate and/or quality level of profiles in the adaptive profile ladder. The video streams that are used may thus be optimized for the video because the selected video streams are optimized for the associated profiles in the adaptive profile ladder.

Adaptive Profile Ladder Generation Process

Figure 5:
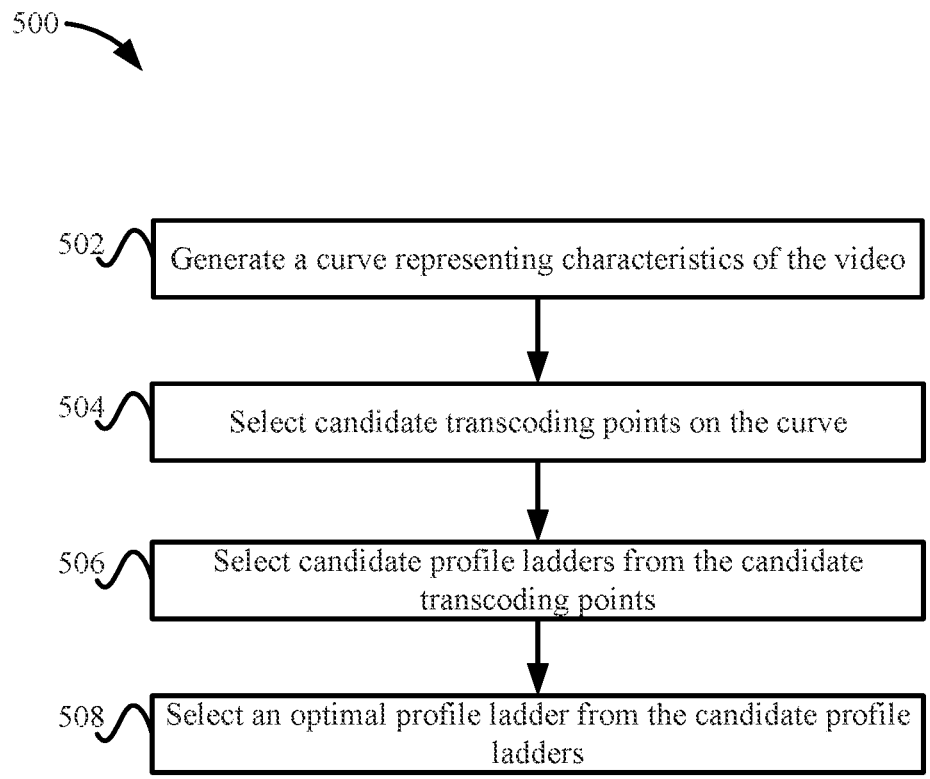
FIG. 5 depicts a simplified flowchart of a method for generating the adaptive profile ladder according to some embodiments.

FIG. 5 depicts a simplified flowchart 500 of a method for generating the adaptive profile ladder according to some embodiments. At 502, adaptive profile ladder generator 108 generates a curve that represents characteristics of a video, such as a quality and bitrate relationship for the video. Although a curve is described, other representations may be used, such as bar charts, etc. In some embodiments, the curve may be a rate distortion (RD) curve of the video. The rate distortion curve may be received based on a prediction, such as by using machine-learning. For example, a machine-learning algorithm may analyze the characteristics of the video to generate a rate distortion curve for the video. In other examples, the rate distortion curve is generated using transcoding results, such as from transcoding of the video or a similar video.

Figure 6:
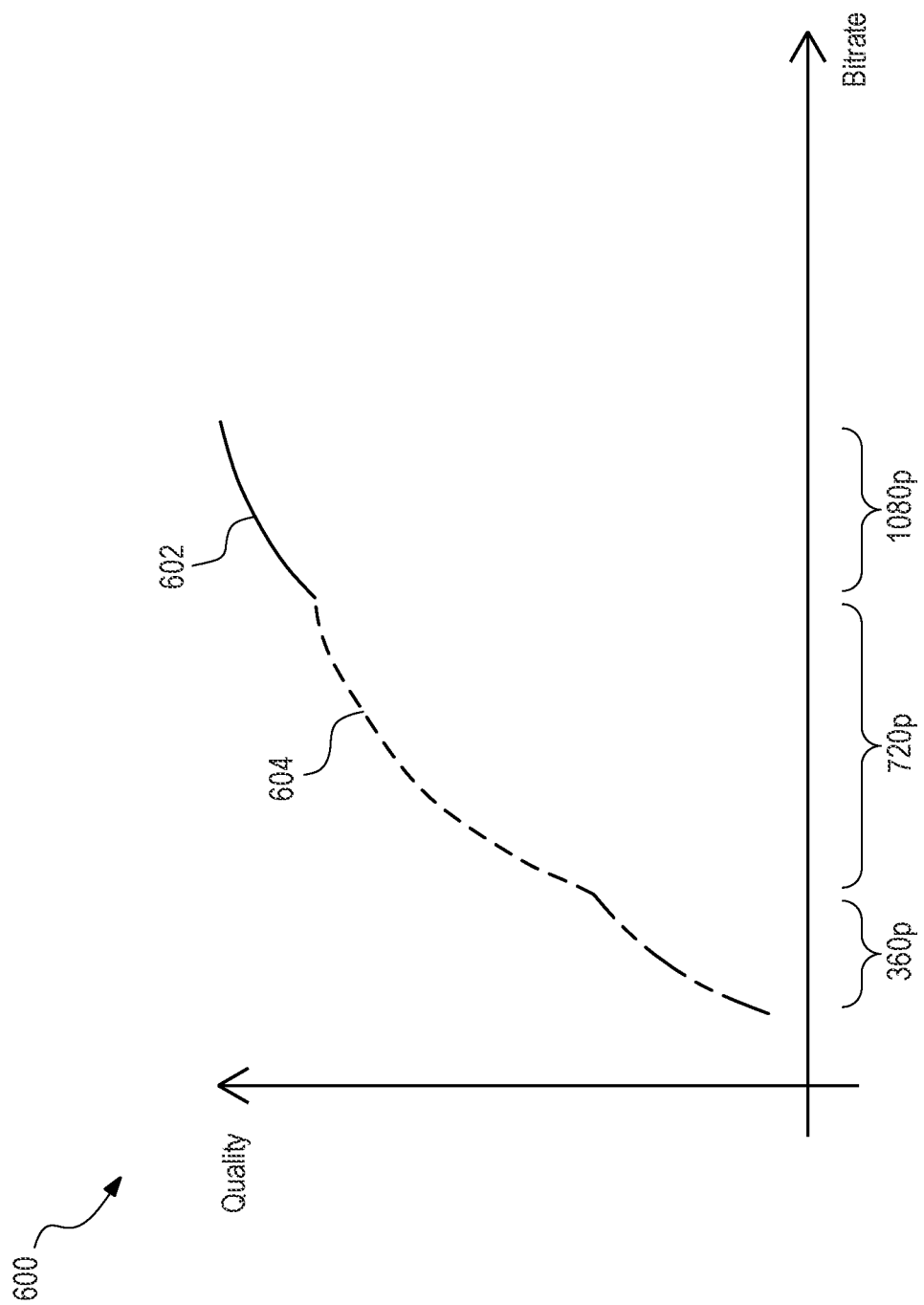
FIG. 6 depicts an example of a rate distortion curve according to some embodiments.

FIG. 6 depicts an example of a rate distortion curve 600 according to some embodiments. The Y axis of graph 600 plots quality and the X axis measures bitrate. A curve 602 plots the relationship between quality and bitrate. Quality may be measured using different characteristics, such as peak signal to noise ratio, structural similarity index, and other measures of distortion. Different points on the curve indicate the relationship of quality, bitrate, and resolution. In some embodiments, curve 602 is generated using video features 212 from the video or another video. Also, different points on curve 602 may correspond to different transcoding parameter configurations, such as a point may correspond to a bitrate and a resolution. For example, different sections of curve 602 are associated with different resolutions of 360p, 720p, and 1080p. When a point on curve 602 falls within one of the ranges for the resolutions, the point is assigned the respective resolution. For example, a point at 604 is assigned an associated bitrate from the X axis and a resolution of 720p because the point lies within the range associated with 720p.

Figure 7:
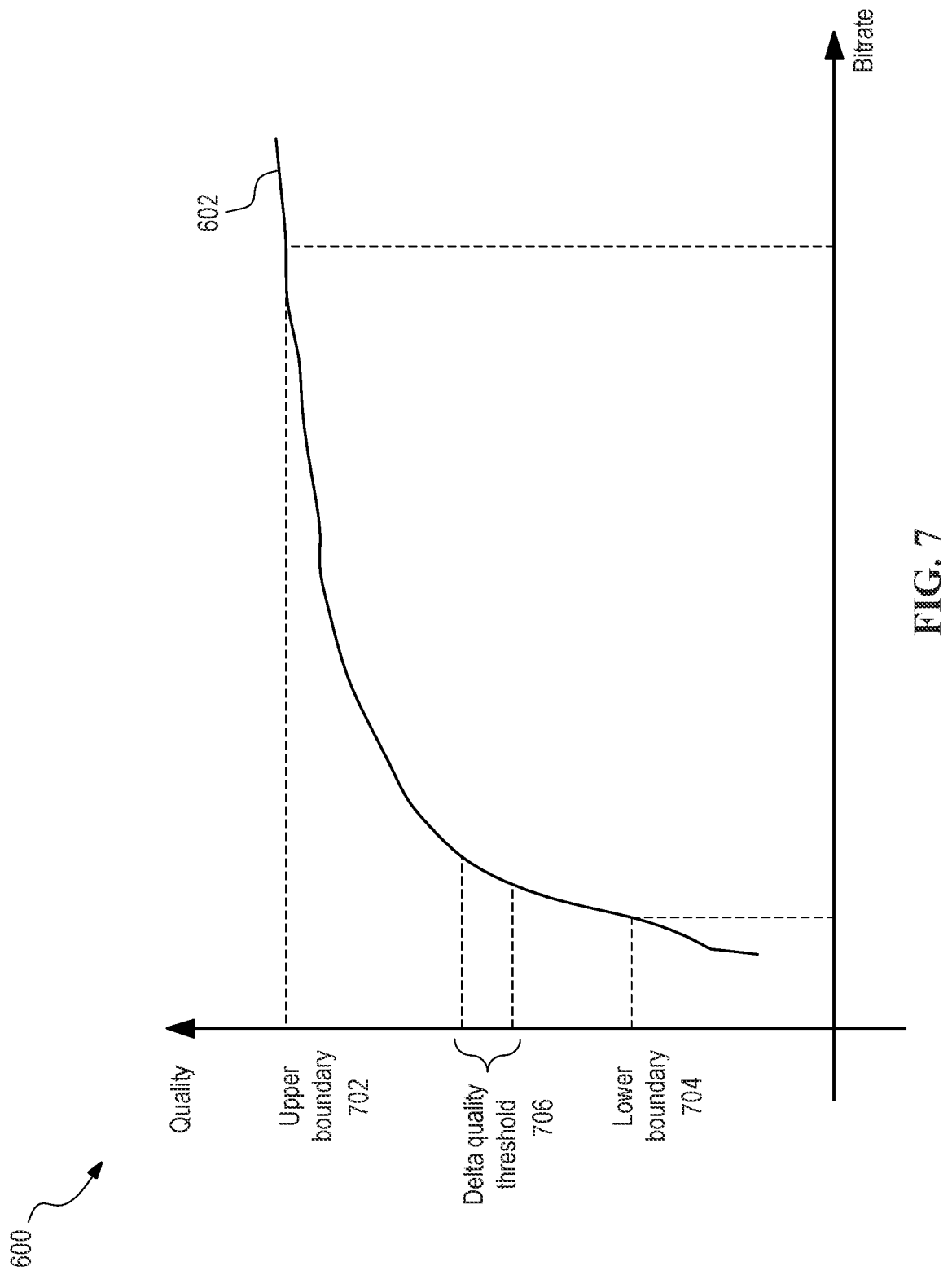
FIG. 7 depicts an example of determining candidate transcoding points according to some embodiments.

Referring back to FIG. 5, at 504, adaptive profile ladder generator 108 selects candidate transcoding points on curve 602. The candidate transcoding points may be a series of discrete points on curve 602. Each candidate transcoding point may represent a possible point that could be used to transcode the video. Different methods may be used to determine the candidate transcoding points. FIG. 7 depicts an example of determining candidate transcoding points according to some embodiments. Adaptive profile ladder generator 108 may select an upper boundary 702 and a lower boundary 704. Upper boundary 702 may be the maximum quality and bitrate and lower boundary 704 may be the minimum quality and bitrate that could be used for a candidate transcoding point. That is, candidate transcoding points may only be between lower boundary 704 and upper boundary 702.

Adaptive profile ladder generator 108 may select upper boundary 702 and lower boundary 704 based on different information, such as video-specific information 208 and/or historical playback information 210. For example, adaptive profile ladder generator 108 uses a higher upper boundary 702 on content whose complexity is more complex and a lower upper boundary 702 on content whose complexity is less complex. The higher upper boundary 702 is used for more complex content to make sure that the quality level of the complex content is high to show the details of the complex content. However, less complex content may not need as high a quality of transcoding to show the complexity of the content.

Figure 8:
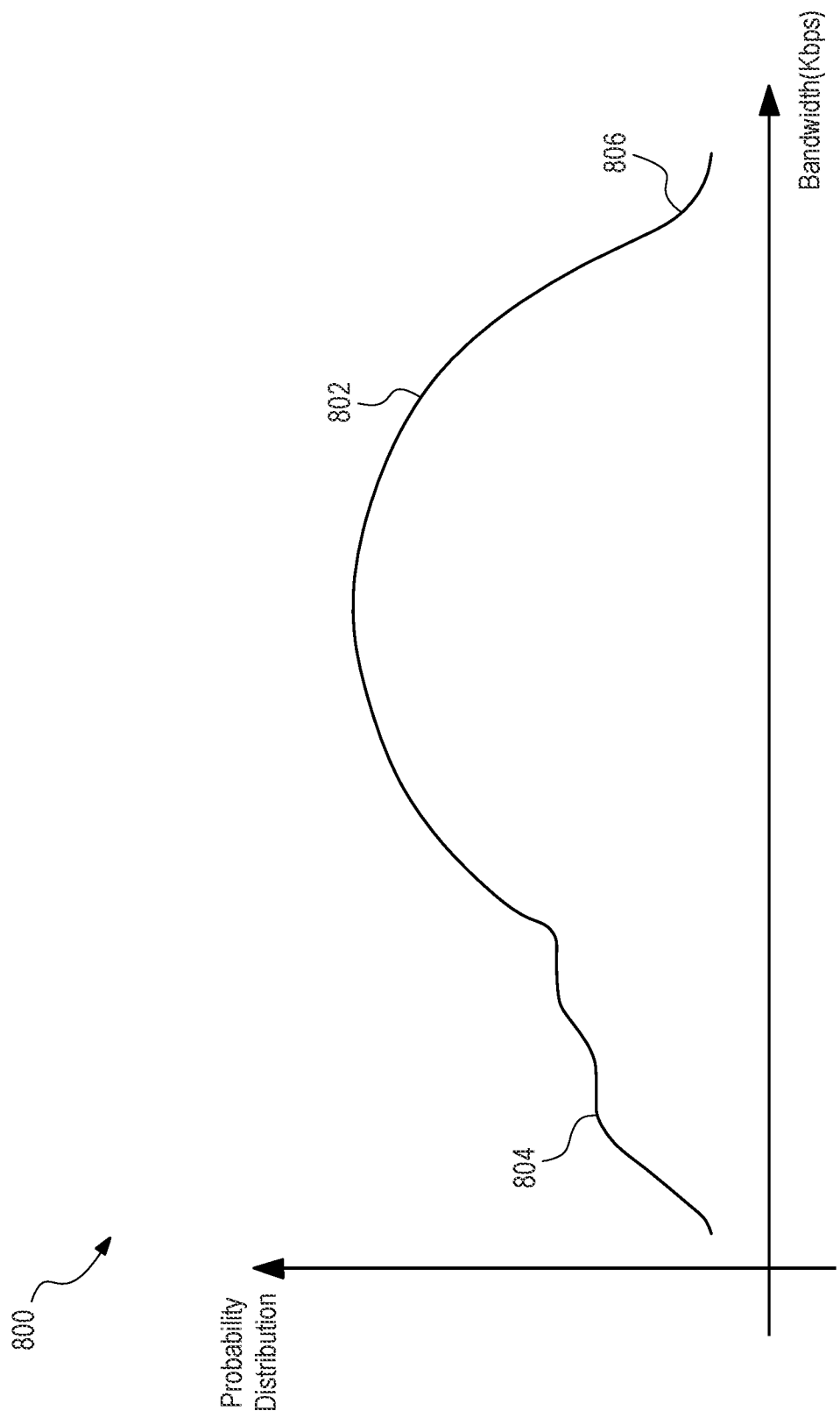
FIG. 8 depicts an example of a graph of bandwidth distribution according to some embodiments.

Adaptive profile ladder generator 108 may also use historical playback information 210 to select upper boundary 702 and lower boundary 704. For example, the adaptive bitrate algorithm and the bandwidth distribution used during playback may provide information on the bitrate distribution that was used during playback of videos. FIG. 8 depicts an example of a graph 800 of bandwidth distribution according to some embodiments. The Y axis of graph 800 is a probability density and the X axis is a bandwidth. A curve 802 plots the probability of a bandwidth occurring at different bandwidths. For example, the higher the value of a curve at a bandwidth indicates a higher probability that the video will be streamed at that bandwidth. Adaptive profile ladder generator 108 may select upper boundary 702 and lower boundary 704 based on the bandwidth distribution. For example, if a point at 804 on curve 802 indicates that the video may be streamed in the portion of bandwidth that is larger than 200 Kbps at a 99% probability, adaptive profile ladder generator 108 may use that value to determine lower boundary 704. Also, a factor, such as an ABR algorithm safe factor, may be used to determine lower boundary 704. A safe factor is used such that the bandwidth selected includes a margin of error. If the safe factor is 0.7, then 200 Kbps× 0.7=140 Kbps, which is set as lower boundary 704. The same calculation may be performed for upper boundary 702.

For example, at 806, if 99% of the bandwidth is lower than 12 Megabytes per second (Mbps) and the safe factor is 1.2, then upper boundary 702 may be 14.4 Mbps. Other ways of determining upper boundary 702 and lower boundary 704 may be used.

Adaptive profile ladder generator 108 may also use information to generate the resolution range. For example, a device type from client playback features 220 may be used to select a resolution range that represents an upper boundary 702 and a lower boundary 704. Depending on the device type, a different resolution range may be used. For example, a mobile phone may use a resolution range between 216P to 720P and a television may use a resolution range between 540P to 8K.

Referring back to FIG. 7, adaptive profile ladder generator 108 may also determine a delta quality threshold 706. Delta quality threshold 706 may be a difference in quality that two consecutive candidate transcoding points should be apart on curve 602. For example, within a delta quality threshold 706, only one candidate transcoding point should be found. Using delta quality threshold 706 ensures that candidate transcoding points are not within a certain amount of quality of each other, which may spread the quality measurement out across curve 602. That is, there may not be much advantage of having two profiles with the same quality in the adaptive profile ladder.

Figure 9:
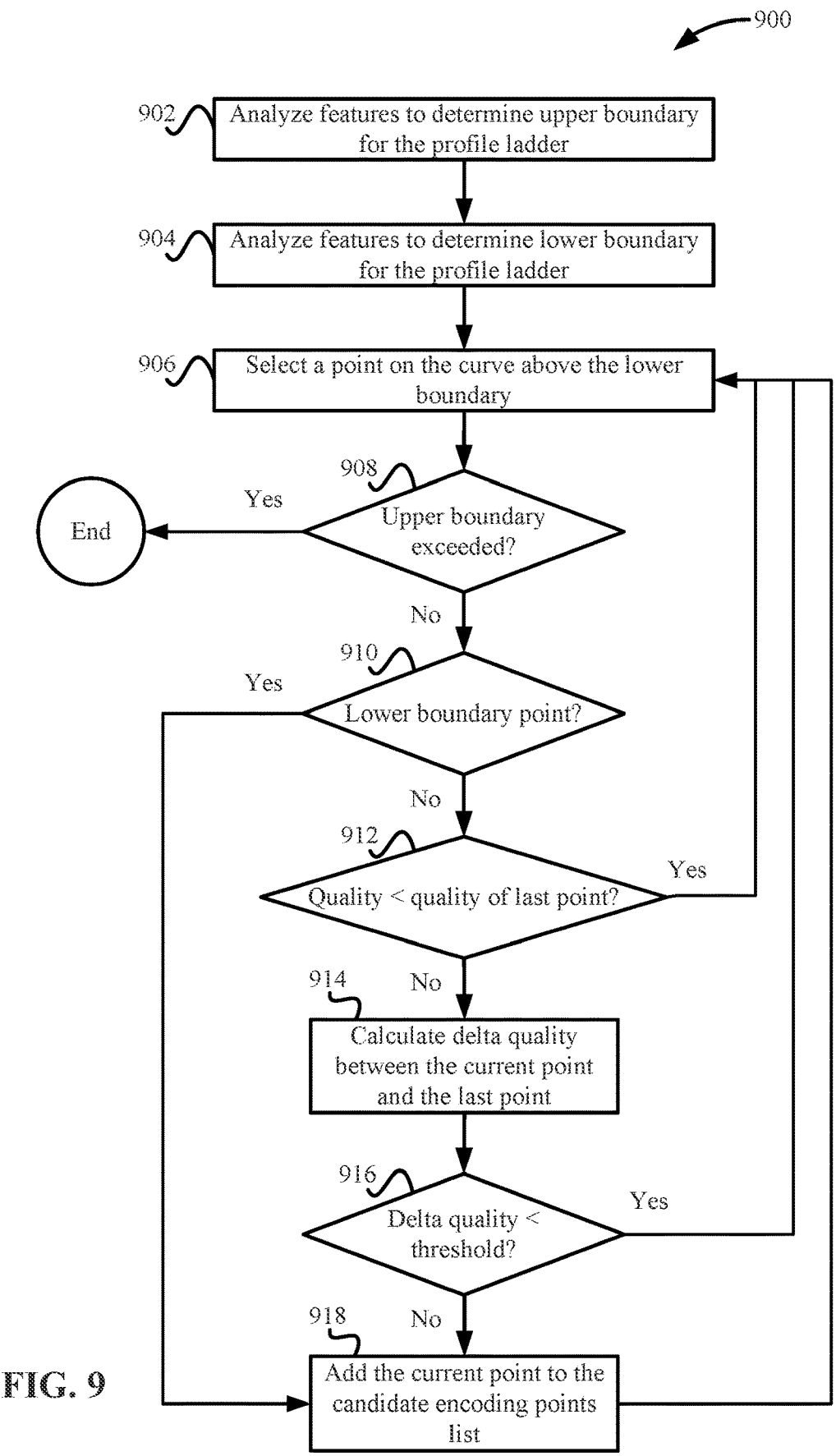
FIG. 9 depicts a simplified flowchart of a method for selecting candidate transcoding points according to some embodiments.

Using upper boundary 702, lower boundary 704, and delta quality threshold 706, adaptive profile ladder generator 108 generates candidate transcoding points. FIG. 9 depicts a simplified flowchart 900 of a method for selecting candidate transcoding points according to some embodiments. At 902, adaptive profile ladder generator 108 analyzes features to determine an upper boundary for the profile ladder. At 904, adaptive profile ladder generator 108 analyzes features to determine lower boundary 704 for the profile ladder. The features in video-specific information 208 and/or historical playback information 210 that are described above may be analyzed to determine upper boundary 702 and lower boundary 704.

At 906, adaptive profile ladder generator 108 selects a point above lower boundary 704. Curve 602 may include discrete points and adaptive profile ladder generator 108 may select each discrete point on curve 602. Also, adaptive profile ladder generator 108 may select a point on curve 602 based on an interval, such as a point is selected every X amount of bitrate.

At 908, adaptive profile ladder generator 108 determines if an upper boundary 702 is exceeded. For example, if upper boundary 702 is exceeded, then the process ends. Adaptive profile ladder generator 108 does not need to analyze points above upper boundary 702.

At 910, if upper boundary 702 is not exceeded, adaptive profile ladder generator 108 determines if this point is equal to lower boundary 704. This may only happen when the first point is selected in the process. If this is the first point, then at 918, adaptive profile ladder generator 108 adds the current point to a candidate transcoding points list. For example, adaptive profile ladder generator 108 may always include a point for lower boundary 704, but this does not need to occur. Candidate transcoding points list may be a list of candidate transcoding points that are determined.

If the point is not the lower boundary 704, at 912, adaptive profile ladder generator 108 determines if a quality of the current point is less than a quality of the last point. Because the points are being selected sequentially from lower boundary point 704 to upper boundary point 702, adaptive profile ladder generator 108 may include a candidate transcoding point in the candidate transcoding points list that has a higher quality than the last selected point. This is because including a transcoding point with a lower quality with a higher bitrate may not be desirable because the increase in bitrate and decrease in quality does not improve playback conditions. If the quality of the current point is less than the quality of the last selected point, then adaptive profile ladder generator 108 does not select this point and the process reiterates to 906 to select another point on curve 602.

If the quality is not less than the quality of the last point, at 914, adaptive profile ladder generator 108 calculates the delta quality between the current point and the last point. This is the difference in quality between the current point and the last point. At 916, adaptive profile ladder generator 108 determines if the delta quality is less than a threshold. The threshold may be the delta quality threshold 706. Adaptive profile ladder generator 108 may not add a candidate transcoding point to the candidate transcoding points list if the change quality from the last point is less than the delta quality threshold 706. This is because candidate transcoding points should have a higher quality than the last point by a certain amount because it may not be worth adding a candidate transcoding point that is close to the quality of the last point because the difference in quality that is seen is minimal. If the delta quality is less than delta quality threshold 706, then the process reiterates to 906 to select another point on curve 602. If the delta quality is greater than delta quality threshold 706, at 918, adaptive profile ladder generator 108 adds the current point to the candidate transcoding points list. This finishes the selection of candidate transcoding points.

Referring back to FIG. 5, upon determining the candidate transcoding points, at 506, adaptive profile ladder generator 108 selects candidate profile ladders from the candidate transcoding points. For example, adaptive profile ladder generator 108 may output different variations of candidate transcoding points as candidate profile ladders. In some embodiments, adaptive profile ladder generator 108 may use a permutation or combination process for all the candidate transcoding points to generate the candidate profile ladders. The number of profiles that are selected may be defined, such as into 12 profiles. If the candidate transcoding points are more than 12 points, then different combinations of candidate transcoding points can be formed. For example, one combination of candidate transcoding points forms a first profile ladder, a second combination forms a second profile ladder, and so on. Also, adaptive profile ladder generator 108 may identify a subset of combinations based upon rules. For example, adaptive profile ladder generator 108 may want to include candidate transcoding points from selected resolutions, such as the resolutions of 270P, 360P, 480P, 720P, 1080P, etc. These resolutions may be standard resolutions that are generated for the profile ladder conventionally.

At 508, adaptive profile ladder generator 108 selects an optimal profile ladder from the candidate profile ladders. The optimal profile ladder may be an improvement over the standard fixed profile ladder. For example, the optimal profile ladder may have the same quality or higher quality than the original fixed profile ladder and reduce the bitrate from the standard fixed profile ladder as large as possible. In another example, the optimal profile ladder may keep the bitrate the same as the original fixed profile ladder and improve the quality as large as possible from the standard fixed profile ladder. Further, adaptive profile ladder generator 108 uses a combination of the two objectives.

Optimal Profile Ladder Selection

Figure 10:
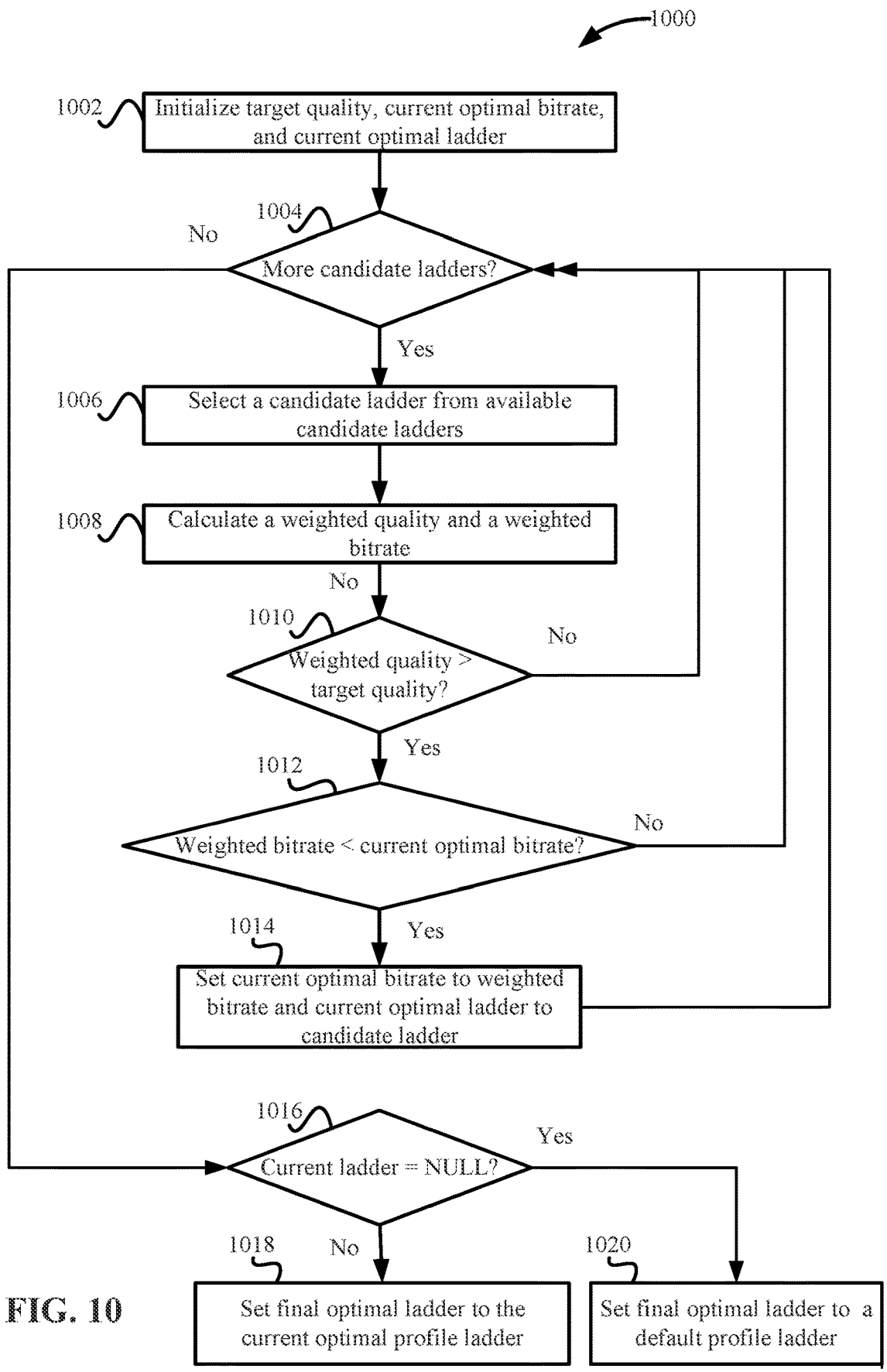
FIG. 10 depicts a simplified flowchart of a method for selecting the optimal profile ladder according to some embodiments.

FIG. 10 depicts a simplified flowchart 1000 of a method for selecting the optimal profile ladder according to some embodiments. This process may balance an improvement in bitrate and quality, but other processes may be used, such as improving bitrate while keeping quality constant or improving the quality while keeping the bitrate constant. At 1002, adaptive profile ladder generator 108 initializes a target quality, a current optimal bitrate, and a current optimal ladder. These may be variables that store values for the process. The target quality that may be a value that represents a measurement of quality that the profile ladder should meet. The current optimal bitrate is the value of the current optimal bitrate for the current optimal ladder. The current optimal ladder is the identifier of the profile ladder that has been selected as the current optimal ladder. The current optimal bitrate and the current optimal ladder may change as profile ladders are analyzed.

At 1004, adaptive profile ladder generator 108 determines if there are more candidate profile ladders to review. If not, the process proceeds to 1016 where adaptive profile ladder generator 108 determines if the current optimal ladder is equal to NULL. The value NULL means a profile ladder has not been set for the current optimal ladder. In this case, none of the candidate profile ladders have met the conditions to be set as the current optimal ladder. If the current optimal ladder is equal to NULL, at 1020, adaptive profile ladder generator 108 sets the final optimal ladder to a default profile ladder. The default profile ladder may be the standard fixed profile ladder or may be another profile ladder designated as the default profile ladder.

If there are additional candidate ladders to analyze, at 1006, adaptive profile ladder generator 108 selects a candidate profile ladder from the available candidate profile ladders. At 1008, adaptive profile ladder generator 108 calculates a weighted quality and a weighted bitrate. The weighted quality and the weighted bitrate may be values that represent the different quality and bitrates of the profiles in the candidate profile ladder. The weighted quality and the weighted bitrate reflect the different importance of different profiles in a candidate profile ladder. For example, each profile in a candidate profile ladder may include an associated quality and bitrate and some profiles may be more important, such as some profiles may be used more often during playback. The weighted quality and the weighted bitrate represent a probability that profiles may be used during playback and weight those profiles associated quality and bitrates higher. Upon applying the weights for the profiles, adaptive profile ladder generator 108 determines a weighted quality and weight bitrate for the candidate profile ladder. Although a weighted quality and a weighted bitrate are described, other methods of representing the quality and the bitrate may be used, such as not using a weighted quality and a weighted bitrate.

Figure 11:
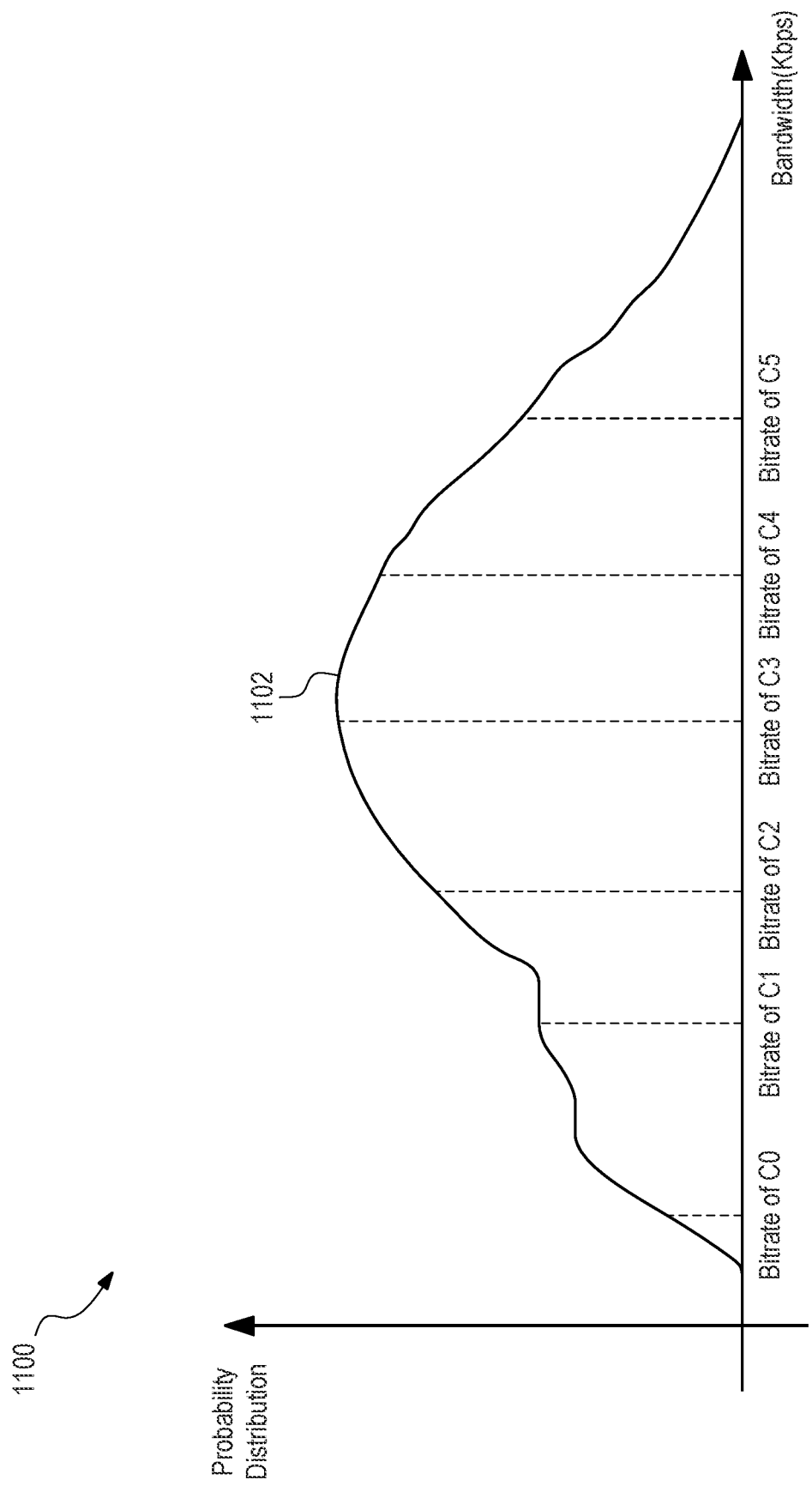
FIG. 11 depicts an example of a graph for determining a weighted quality according to some embodiments.

The weighted quality and the weighted bitrate may be generated using different methods. Adaptive profile ladder generator 108 may use the bandwidth distribution as the weighted value, use characteristics of a business situation as the weighted value, etc. The business situation may determine the weighted value by emphasizing certain profiles that are designated as important by a business entity. Also, the bandwidth distribution and the adaptive bitrate model may be used to determine which quality and bitrates are more important. FIG. 11 depicts an example of a graph 1100 for determining a weighted quality according to some embodiments. The Y axis is the probability distribution and the X axis is the bandwidth. A curve 1102 is the bandwidth distribution for the candidate profile ladder. The height of curve 1102 for a bandwidth may represent the number of playback instances that experience this bitrate during playback. The number of playback instances may be based on information from content delivery networks 106 or clients 104, which record the bandwidth during playback.

Figure 12:
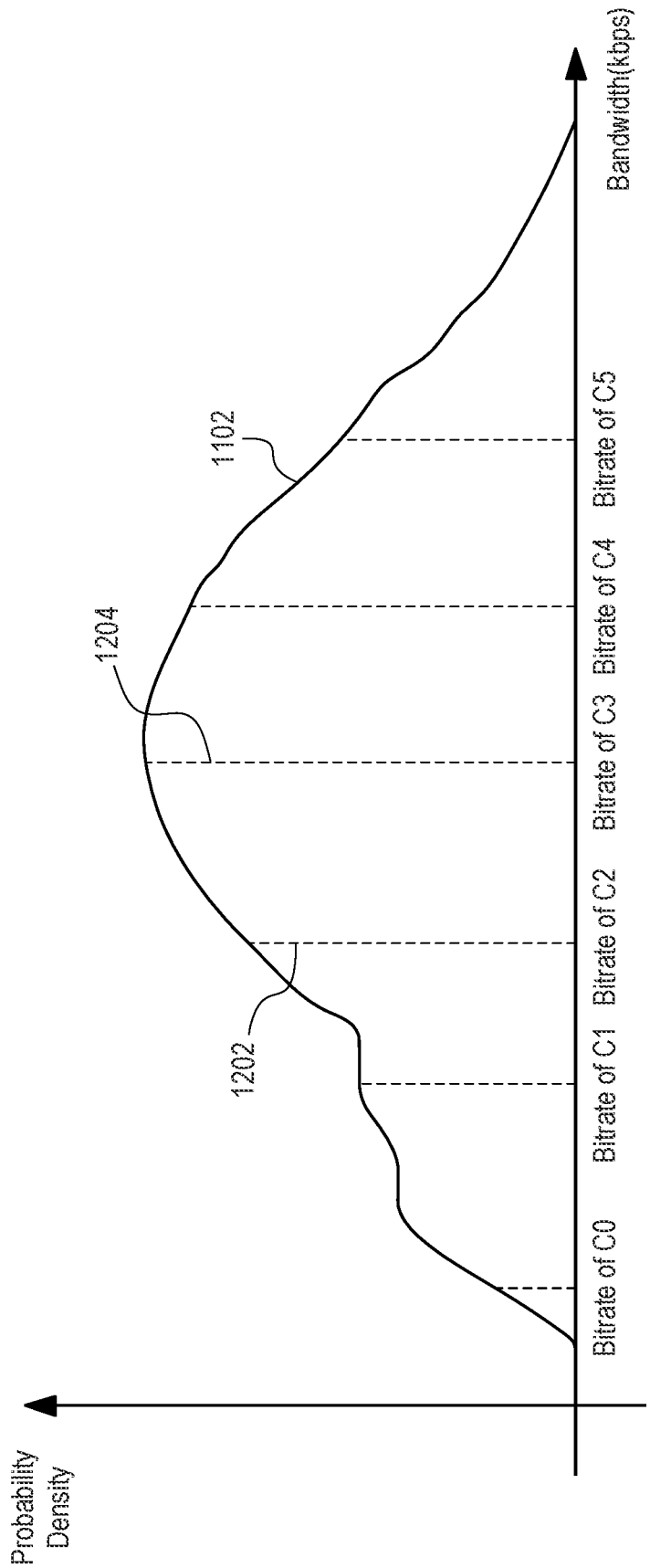
FIG. 12 depicts the bitrate of each profile of the profile ladder on the bandwidth distribution according to some embodiments.

Adaptive profile ladder generator 108 then selects N candidate profiles C0, C1, C2, C3, C4, C5, etc. The candidate profile ladder includes profiles that are associated with different bitrates. The bitrate of each profile of the profile ladder on the bandwidth distribution is shown in FIG. 12. Each bitrate intersects the curve 1102 and shows the number of cases that experience this bitrate during playback. For example, at bitrate C3, a large number of cases of playback experienced this bitrate.

Adaptive profile ladder generator 108 determines a usable range of each profile. The usable range may be based on applying a safe factor to the lower bitrate boundary and to the upper boundary. For example, if one profile is from the range with the bitrate of C2 to bitrate of C3, a lower boundary of C2 has a safe factor applied, which lowers the bitrate of C2. Also, the upper boundary of C3 has a safe factor applied that may increase the bitrate of C3. For example, for a profile n, the lower boundary of the range may be calculated using:

$$\text{Range\_n}_{down} = \frac{c_n\_\text{bitrate}}{\text{safe\_factor}}$$

The lower boundary bitrate $C_n\_\text{bitrate}$ is divided by the safe factor, safe_factor to lower the lower boundary.

The upper boundary of the range may be calculated using:

$$\text{Range\_n}_{up} = \frac{c_{n+1}\_\text{bitrate}}{\text{safe\_factor}} = \text{Range\_}(n+1)_{down}$$

The bitrate of the upper boundary bitrate $C_{n+1}\_\text{bitrate}$ is divided by the safe factor to lower the upper boundary. For example, if the safe_factor is 0.7, it means that if the available network bandwidth is 1000 Kbps, ABR algorithm 110 may only request profiles with bitrates up to 700 Kbps to reduce the risk of re-buffer by requesting a profile with too high of a bitrate to support playback without rebuffering.

Figure 13:
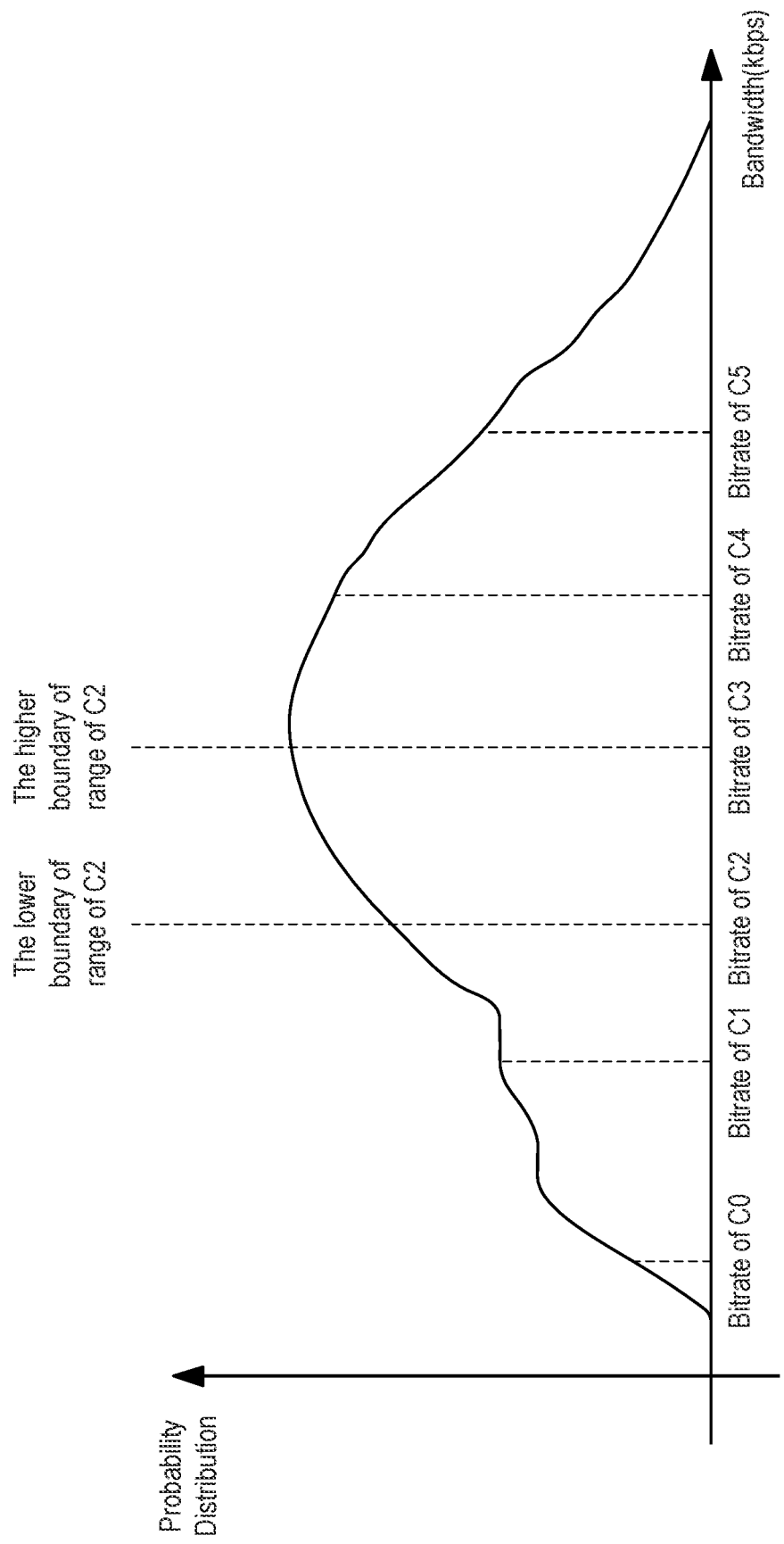
FIG. 13 depicts an example of the usable range of the profile between the bitrate of C2 and the bitrate of C3 according to some embodiments.

Upon applying the safe factor, FIG. 13 depicts an example of the usable range of the profile between the bitrate of C2 and the bitrate of C3 according to some embodiments. The lower boundary of the range of C2 at 1202 and the higher upper boundary of the range of C2 at 1204 have been moved based on the safe factor. Also, different ranges may be provided between other bitrates. For example, range C0 is between the bitrate of C0 and the bitrate of C1, the range C1 is between the bitrate of C1 and the bitrate of C2, the range of C3 is between the bitrate of C3 and the bitrate of C4, and the range of C4 is between the bitrate of C4 and the bitrate of C5.

Adaptive profile ladder generator 108 calculates the probability for the usable range of each profile as the weighted value of each profile. The probability may be how likely the profile is going to be used during playback. For example, the area under the curve for each range may be used as the probability for the usable range of each profile. Adaptive profile ladder generator 108 then calculates the weighted quality for each profile. The weighted quality is the quality of the range times the probability for each profile. Accordingly, profiles that have a higher probability of occurring with a higher overall quality are weighted more heavily. Adaptive profile ladder generator 108 then uses each profile's weighted quality to determine the weighted quality for the candidate quality ladder, such as by adding or summing each profile's weighted quality.

Referring back to FIG. 10, at 1010, adaptive profile ladder generator 108 determines if the weighted quality is greater than the target quality. If not, then adaptive profile ladder generator 108 does not use this candidate profile ladder and the process reiterates to 1004 to determine if there are other candidate profile ladders to use. The candidate profile ladder is not used because the weighted quality is not high enough.

At 1012, if the weighted quality is greater than the target quality, adaptive profile ladder generator 108 determines if the weighted bitrate is less than the current optimal bitrate. The weighted bitrate may be determined using different ways. The same weight for each bitrate may be used in some cases or the highest profile is weighted higher because that profile may impact rebuffering the most due to it having the highest bitrate. Other methods may also be used to weight the bitrates. Adaptive profile ladder generator 108 may want to include a candidate profile ladder that includes a weighted bitrate that is less than the current optimal bitrate to reduce the bitrate that is being used if this candidate profile ladder is selected. If the weighted bitrate is not greater than the current optimal bitrate, adaptive profile ladder generator 108 reiterates to 1004 to determine if there are more candidate profile ladders.

If the weighted bitrate is not greater than the current optimal bitrate, at 1014, adaptive profile ladder generator 108 sets the current optimal bitrate to the weighted bitrate of the current candidate profile ladder and sets the current optimal ladder to the candidate profile ladder. In this case, the weighted quality and the weighted bitrate meet the requirements of being greater than the target quality and less than the current optimal bitrate. This balances selecting a candidate profile ladder that improves quality and reduces bitrate.

At 1016, the process then reiterates to 1004 to determine if there are more candidate ladders. When there are no more candidate profile ladders, and the current ladder is not equal to NULL, at 1018, adaptive profile ladder generator 108 sets the final optimal ladder to the current optimal profile ladder. Accordingly, adaptive profile ladder generator 108 has selected one of the candidate profile ladders, which may include the highest weighted quality and the lowest weighted bitrate.

Conclusion

The adaptive profile ladder may include profiles with bitrate and/or quality that may be optimal for the video. The adaptive profile ladder can then be used to transcode the video into video streams for the optimal profiles. Alternatively, the adaptive profile ladder may be used to select profiles from a fixed profile ladder. The adaptive profile generation process improves the profiles that are used for the video because the profiles have been adapted for characteristics of the video and historical playback information. For example, a cartoon, which has a lower complexity, may have a profile with lower bitrate profiles because enough quality is provided at the lower bitrates. In some examples, the highest profile may have a bitrate of 1000 Kbps. However, a live sporting event, which has higher complexity, may have profiles with higher bitrates, because higher bitrates may be required to achieve the same quality levels as lower bitrates could achieve for a cartoon. In some examples, the sporting event may have a highest profile that has a bitrate of 6000 Kbps. The improvement in profiles may improve the playback experience because clients 104 may be provided with profiles that may be better suited for the playback of the video. In this case, the quality of the video may be increased and the bitrate used may be decreased.

EMBODIMENTS

In some embodiments, a method comprising: generating, by a computing device, a representation for a video that represents a relationship of a bitrate to a quality measurement for the video; selecting, by the computing device, candidate transcoding points on the representation; generating, by the computing device, a plurality of candidate profile ladders based on the candidate transcoding points, wherein the plurality of candidate profile ladders include a different combination of profiles, and wherein a profile is associated with at least one of a bitrate and a quality measurement; selecting, by the computing device, a profile ladder from the plurality of candidate profile ladders based on analyzing the bitrate or the quality of the profile ladder; and using, by the computing device, the profile ladder for the video.

In some embodiments, using the profile ladder for the video comprises: transcoding the video into a plurality of video streams based on profiles in the profile ladder.

In some embodiments, transcoding the video into the plurality of video streams comprises: transcoding each video stream based on at least one of the bitrate and the quality measurement associated with a respective profile.

In some embodiments, using the profile ladder for the video comprises: selecting profiles from a standard profile ladder based on the profiles of the selected profile ladder.

In some embodiments, selecting profiles from the standard profile ladder based on the profiles of the selected profile ladder comprises: selecting a profile from the standard profile that has at least one of the bitrate and the quality measurement closest to a profile in the selected profile ladder.

In some embodiments, generating the representation for the video comprises: generating a curve that represents the relationship of the bitrate to the quality measurement.

In some embodiments, selecting the candidate transcoding points comprises: selecting points on the representation when a current point includes a higher quality than a last point.

In some embodiments, selecting points on the representation when the point includes the higher quality than the last point comprises: applying a threshold to a change in quality between the last point and the current point; and adding the current point to the candidate transcoding points when the change in quality meets the threshold.

In some embodiments, selecting points on the representation when the point includes the higher quality than the last point comprises: determining a lower boundary on the representation; determining an upper boundary on the representation; and selecting points on the representation based on the lower boundary and the upper boundary.

In some embodiments, selecting the lower boundary or selecting the upper boundary comprises: using a probability distribution of bitrates that were played back to determine the lower boundary or the upper boundary.

In some embodiments, generating the plurality of candidate profile ladders based on the candidate transcoding points comprises: generating a plurality of combinations from the candidate transcoding points to form the plurality of candidate profile ladders.

In some embodiments, selecting the profile ladder from the plurality of candidate profile ladders comprises: calculating a bitrate representation that is based on bitrates for profiles in a current profile ladder from the plurality of candidate profile ladders; and determining whether to select the current profile ladder based on the bitrate representation.

In some embodiments, the bitrate representation comprises a weighted bitrate that is based on bitrates associated with the profiles of the current profile ladder and a probability of playback of the respective profiles.

In some embodiments, selecting the profile ladder from the plurality of candidate profile ladders comprises: calculating a quality measurement representation for a current profile ladder in the plurality of candidate profile ladders, wherein the quality measurement is based on quality measurements for profiles in a current profile ladder; and determining whether to select the current profile ladder based on the quality representation.

In some embodiments, the quality measurement representation comprises a weighted quality measurement that is based on quality measurements associated with the profiles of the current profile ladder and a probability of playback of the respective profiles.

In some embodiments, a non-transitory computer-readable storage medium containing instructions, that when executed, control a computer system to be operable for: generating a representation for a video that represents a relationship of a bitrate to a quality measurement for the video; selecting candidate transcoding points on the representation; generating a plurality of candidate profile ladders based on the candidate transcoding points, wherein the plurality of candidate profile ladders includes a different combination of profiles, and wherein a profile is associated with at least one of a bitrate and a quality measurement; selecting a profile ladder from the plurality of candidate profile ladders based on analyzing the bitrate or the quality of the profile ladder; and using the profile ladder for the video.

In some embodiments, using the profile ladder for the video comprises: transcoding the video into a plurality of video streams based on profiles in the profile ladder.

In some embodiments, transcoding the video into the plurality of video streams comprises: transcoding each video stream based on at least one of the bitrate and the quality measurement associated with a respective profile.

In some embodiments, using the profile ladder for the video comprises: selecting profiles from a standard profile ladder based on the profiles of the selected profile ladder.

In some embodiments, an apparatus comprising: one or more computer processors; and a non-transitory computer-readable storage medium comprising instructions, that when executed, control the one or more computer processors to be operable for: generating a representation for a video that represents a relationship of a bitrate to a quality measurement for the video; selecting candidate transcoding points on the representation; generating a plurality of candidate profile ladders based on the candidate transcoding points, wherein the plurality of candidate profile ladders includes a different combination of profiles, and wherein a profile is associated with at least one of a bitrate and a quality measurement; selecting a profile ladder from the plurality of candidate profile ladders based on analyzing the bitrate or the quality of the profile ladder; and using the profile ladder for the video.

System

Figure 14:
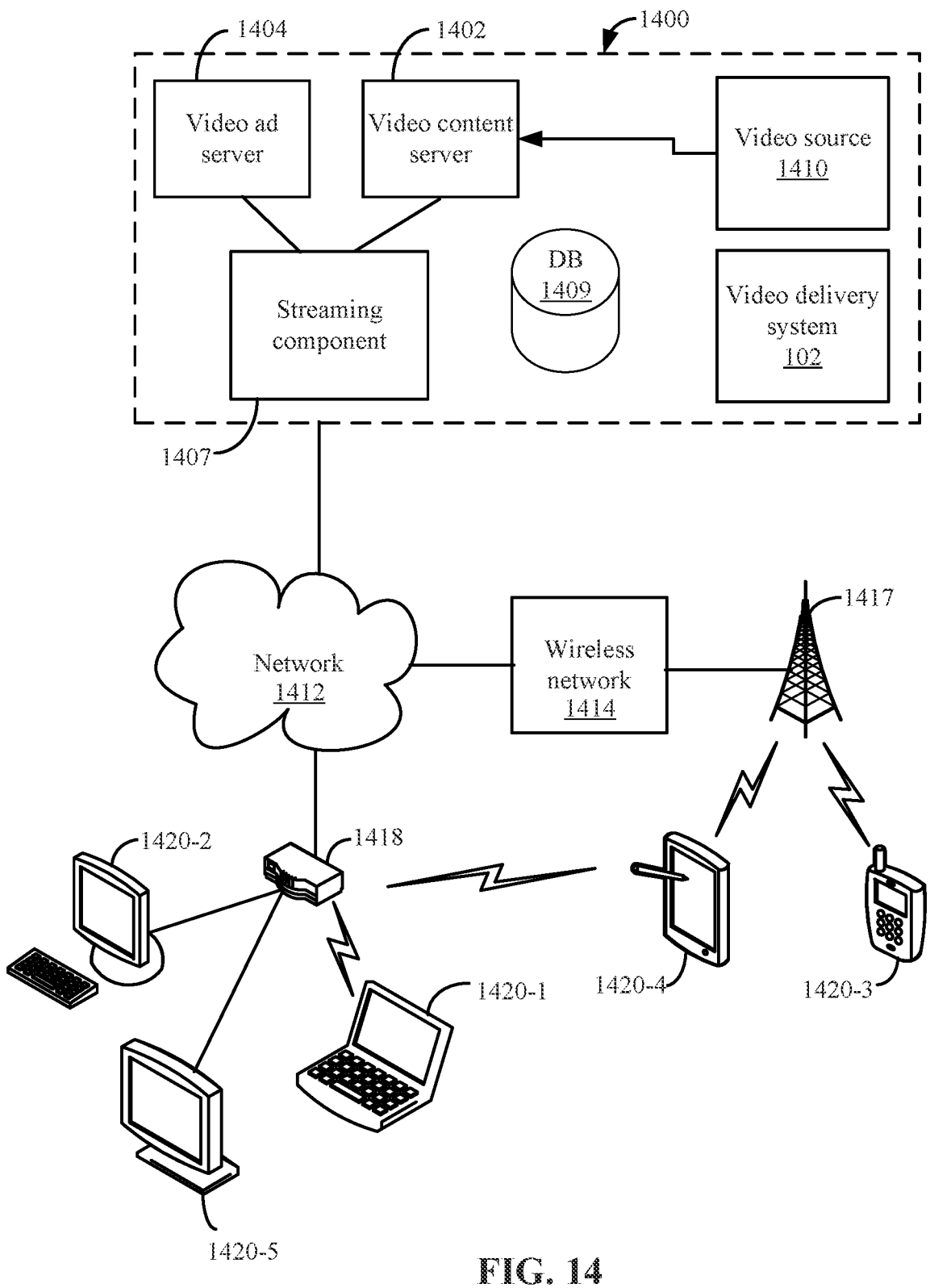
FIG. 14 depicts a video streaming system in communication with multiple client devices via one or more communication networks according to one embodiment.

Features and aspects as disclosed herein may be implemented in conjunction with a video streaming system 1400 in communication with multiple client devices via one or more communication networks as shown in FIG. 14. Aspects of the video streaming system 1400 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1400, video data may be obtained from one or more sources for example, from a video source 1410, for use as input to a video content server 1402. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1400 may include one or more computer servers or modules 1402, 1404, and/or 1407 distributed over one or more computers. Each server 1402, 1404, 1407 may include, or may be operatively coupled to, one or more data stores 1409, for example databases, indexes, files, or other data structures. A video content server 1402 may access a data store (not shown) of various video segments. The video content server 1402 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1404 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 1400, a public service message, or some other information. The video advertising server 1404 may serve the video advertising segments as directed by a user interface controller (not shown).

The video streaming system 1400 also may include video delivery system 102.

The video streaming system 1400 may further include an integration and streaming component 1407 that integrates video content and video advertising into a streaming video segment. For example, streaming component 1407 may be a content server or streaming media server. A controller (not shown) may determine the selection or configuration of advertising in the streaming video based on any suitable algorithm or process. The video streaming system 1400 may include other modules or units not depicted in FIG. 14, for example, administrative servers, commerce servers, network infrastructure, advertising selection engines, and so forth.

The video streaming system 1400 may connect to a data communication network 1412. A data communication network 1412 may comprise a local area network (LAN), a wide area network (WAN), for example, the Internet, a telephone network, a wireless cellular telecommunications network (WCS) 1414, or some combination of these or similar networks.

One or more client devices 1420 may be in communication with the video streaming system 1400, via the data communication network 1412, wireless cellular telecommunications network 1414, and/or another network. Such client devices may include, for example, one or more laptop computers 1420-1, desktop computers 1420-2, "smart" mobile phones 1420-3, tablet devices 1420-4, network-enabled televisions 1420-5, or combinations thereof, via a router 1418 for a LAN, via a base station 1417 for a wireless cellular telecommunications network 1414, or via some other connection. In operation, such client devices 1420 may send and receive data or instructions to the system 1400, in response to user input received from user input devices or other input. In response, the system 1400 may serve video segments and metadata from the data store 1409 responsive to selection of media programs to the client devices 1420. Client devices 1420 may output the video content from the streaming video segment in a media player using a display screen, projector, or other video output device, and receive user input for interacting with the video content.

Distribution of audio-video data may be implemented from streaming component 1407 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1407 may communicate with client device 1420 using control messages and data messages to adjust to changing network conditions as the video is played. These control messages can include commands for enabling control functions such as fast forward, fast reverse, pausing, or seeking to a particular part of the file at the client.

Since streaming component 1407 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1407 may use TCP-based protocols, such as HTTP and Real Time Messaging Protocol (RTMP). Streaming component 1407 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 15:
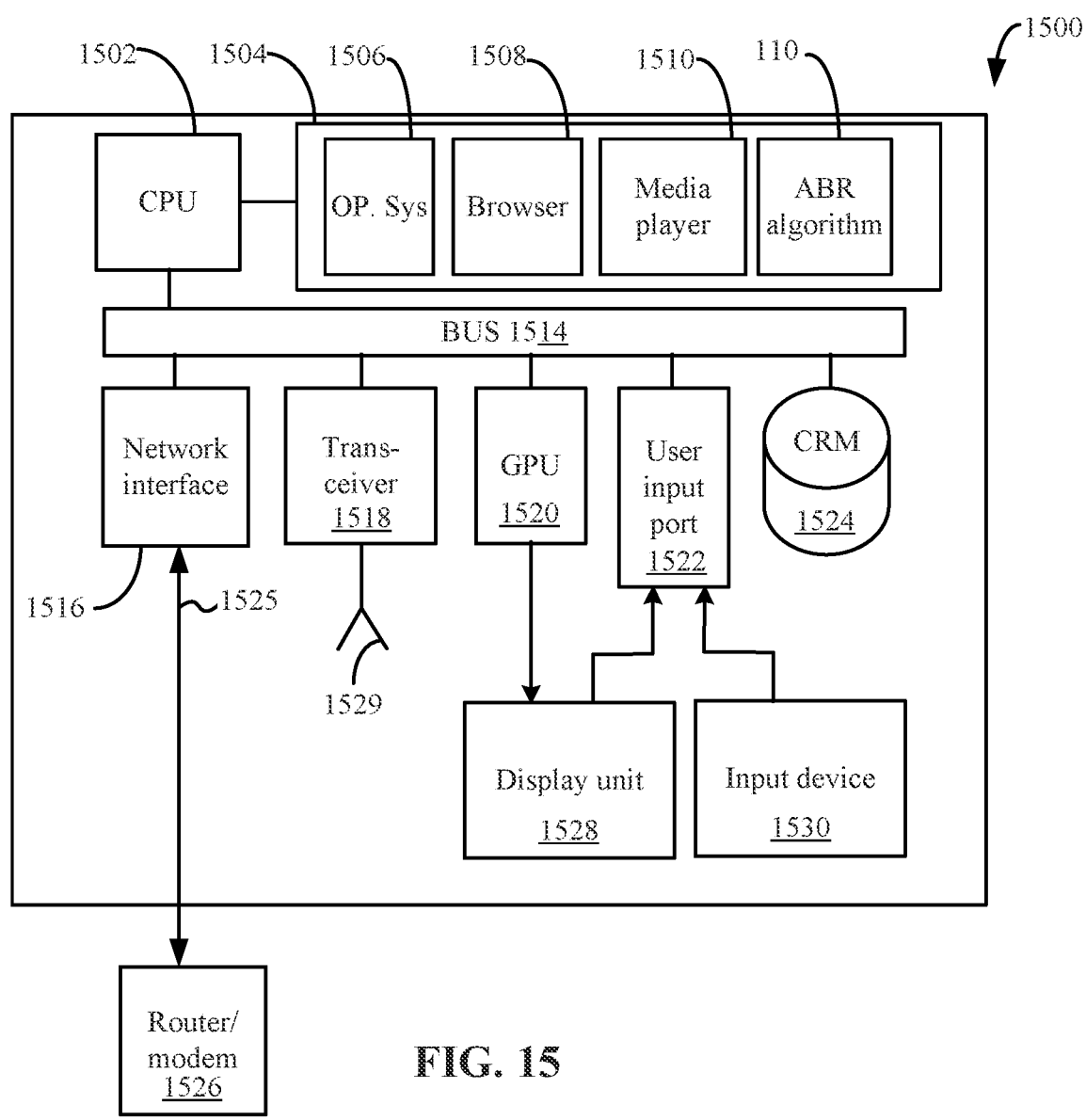
FIG. 15 depicts a diagrammatic view of an apparatus for viewing video content and advertisements.

Referring to FIG. 15, a diagrammatic view of an apparatus 1500 for viewing video content and advertisements is illustrated. In selected embodiments, the apparatus 1500 may include a processor (CPU) 1502 operatively coupled to a processor memory 1504, which holds binary-coded functional modules for execution by the processor 1502. Such functional modules may include an operating system 1506 for handling system functions such as input/output and memory access, a browser 1508 to display web pages, and media player 1510 for playing video. The modules may further include ABR algorithm 110. The memory 1504 may hold additional modules not shown in FIG. 15, for example modules for performing other operations described elsewhere herein.

A bus 1514 or other communication component may support communication of information within the apparatus 1500. The processor 1502 may be a specialized or dedicated microprocessor configured or operable to perform particular tasks in accordance with the features and aspects disclosed herein by executing machine-readable software code defining the particular tasks. Processor memory 1504 (e.g., random access memory (RAM) or other dynamic storage device) may be connected to the bus 1514 or directly to the processor 1502, and store information and instructions to be executed by a processor 1502. The memory 1504 may also store temporary variables or other intermediate information during execution of such instructions.

A computer-readable medium in a storage device 1524 may be connected to the bus 1514 and store static information and instructions for the processor 1502; for example, the storage device (CRM) 1524 may store the modules 1506, 1508, 1510 and 1515 when the apparatus 1500 is powered off, from which the modules may be loaded into the processor memory 1504 when the apparatus 1500 is powered up. The storage device 1524 may include a non-transitory computer-readable storage medium holding information, instructions, or some combination thereof, for example instructions that when executed by the processor 1502, cause the apparatus 1500 to be configured or operable to perform one or more operations of a method as described herein.

A communication interface 1516 may also be connected to the bus 1514. The communication interface 1516 may provide or support two-way data communication between the apparatus 1500 and one or more external devices, e.g., the streaming system 1400, optionally via a router/modem 1526 and a wired or wireless connection. In the alternative, or in addition, the apparatus 1500 may include a transceiver 1518 connected to an antenna 1529, through which the apparatus 1500 may communicate wirelessly with a base station for a wireless communication system or with the router/modem 1526. In the alternative, the apparatus 1500 may communicate with a video streaming system 1400 via a local area network, virtual private network, or other network. In another alternative, the apparatus 1500 may be incorporated as a module or component of the system 1400 and communicate with other components via the bus 1514 or by some other modality.

The apparatus 1500 may be connected (e.g., via the bus 1514 and graphics processing unit 1520) to a display unit 1528. A display 1528 may include any suitable configuration for displaying information to an operator of the apparatus 1500. For example, a display 1528 may include or utilize a liquid crystal display (LCD), touchscreen LCD (e.g., capacitive display), light emitting diode (LED) display, projector, or other display device to present information to a user of the apparatus 1500 in a visual display.

One or more input devices 1530 (e.g., an alphanumeric keyboard, microphone, keypad, remote controller, game controller, camera, or camera array) may be connected to the bus 1514 via a user input port 1522 to communicate information and commands to the apparatus 1500. In selected embodiments, an input device 1530 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1528, for example using a touch sensitive screen. A cursor control device may communicate direction information and command selections to the processor 1502 and control cursor movement on the display 1528. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   analyzing, by a computing device, content of a video to generate a representation for a video that represents a relationship of a bitrate to a quality measurement for the video;
   selecting, by the computing device, a plurality of candidate points on the representation;
   generating, by the computing device, a plurality of combinations from at least a portion of the plurality of candidate points to form a plurality of profile ladders, wherein profile ladders in the plurality of profile ladders include a plurality of profiles, wherein profiles in the plurality of profiles are associated with second values;
   determining, by the computing device, a plurality of second values that is associated with the plurality of profiles for each profile ladder in the plurality of profile ladders;
   generating, by the computing device, a first value that represents the bitrate or quality for profile ladders in the plurality of profile ladders, wherein the first value for a respective profile ladder is generated by combining the plurality of second values for profiles in the profile ladder into the first value;
   selecting, by the computing device, a profile ladder from the plurality of profile ladders based on a comparison of respective first values generated for the profile ladder and other profile ladders in the plurality of profile ladders; and
   using, by the computing device, the profile ladder for the video.

2. The method of claim 1, further comprising:
   receiving playback information; and
   selecting the profile ladder based on the playback information.

3. The method of claim 2, wherein the playback information is from playback of the video or playback of another video.

4. The method of claim 2, wherein the playback information is used to select the candidate points on the representation.

5. The method of claim 2, wherein:
the playback information is used to select a first boundary and a second boundary for the candidate points on the representation, and
candidate points in the plurality of candidate points are selected based on the first boundary and the second boundary.

6. The method of claim 5, wherein the first boundary and the second boundary are selected using bitrates that were played back in the playback information to determine the first boundary or the second boundary.

7. The method of claim 1, wherein the representation is generated by:
analyzing characteristics of the video to generate a relationship between the bitrate and the quality.

8. The method of claim 1, wherein selecting the plurality of candidate points on the representation comprises:
analyzing a quality associated with a position on the representation to determine whether to select the position as a candidate point in the plurality of candidate points.

9. The method of claim 1, wherein profiles in a profile ladder are selected by:
selecting less than all of the plurality of candidate points; and
using the less than all of the plurality of candidate points to select the profiles in the profile ladder.

10. The method of claim 1, wherein selecting the profile ladder comprises:
calculating the first value as a bitrate representation that is based on second values of bitrates for profiles in a current profile ladder from the plurality of profile ladders; and
determining whether to select the current profile ladder as the profile ladder based on the bitrate representation.

11. The method of claim 10, wherein the bitrate representation comprises a weighted bitrate that is based on bitrates associated with the profiles of the current profile ladder and a probability of playback of the respective profiles.

12. The method of claim 1, wherein selecting the profile ladder comprises:
calculating the first value as a quality measurement representation for a current profile ladder in the plurality of profile ladders, wherein the quality measurement representation is based on quality measurements of second values for profiles in a current profile ladder; and
determining whether to select the current profile ladder based on the quality measurement representation.

13. The method of claim 12, wherein the quality measurement representation comprises a weighted quality measurement representation that is based on quality measurements associated with the profiles of the current profile ladder and a probability of playback of the respective profiles.

14. The method of claim 1, wherein using the profile ladder for the video comprises:
transcoding the video into a plurality of video streams based on profiles in the profile ladder.

15. The method of claim 14, wherein transcoding the video into the plurality of video streams comprises:
transcoding each video stream based on at least one of the bitrate and the quality measurement associated with a respective profile.

16. The method of claim 1, wherein using the profile ladder for the video comprises:
selecting profiles from a standard profile ladder based on the profiles of the selected profile ladder.

17. The method of claim 16, wherein selecting profiles from the standard profile ladder based on the profiles of the selected profile ladder comprises:
selecting a profile from the standard profile that has at least one of the bitrate and the quality measurement closest to a profile in the selected profile ladder.

18. The method of claim 1, wherein each profile in the profile ladder is associated with a candidate point and the profile includes a corresponding bitrate and a quality measurement for the respective candidate point.

19. A non-transitory computer-readable storage medium containing instructions, that when executed, control a computer system to be operable for:
analyzing content of a video to generate a representation for a video that represents a relationship of a bitrate to a quality measurement for the video;
selecting a plurality of candidate points on the representation;
generating a plurality of combinations from at least a portion of the plurality of candidate points to form a plurality of profile ladders, wherein profile ladders in the plurality of profile ladders include a plurality of profiles, wherein profiles in the plurality of profiles are associated with second values;
determining a plurality of second values that is associated with the plurality of profiles for each profile ladder in the plurality of profile ladders;
generating a first value that represents the bitrate or quality for profile ladders in the plurality of profile ladders, wherein the first value for a respective profile ladder is generated by combining the plurality of second values for profiles in the profile ladder into the first value;
selecting a profile ladder from the plurality of profile ladders based on a comparison of respective first values generated for the profile ladder and other profile ladders in the plurality of profile ladders; and
using the profile ladder for the video.

20. An apparatus comprising:
one or more computer processors; and
a non-transitory computer-readable storage medium comprising instructions, that when executed, control the one or more computer processors to be operable for:
analyzing content of a video to generate a representation for a video that represents a relationship of a bitrate to a quality measurement for the video;
selecting a plurality of candidate points on the representation;
generating a plurality of combinations from at least a portion of the plurality of candidate points to form a plurality of profile ladders, wherein profile ladders in the plurality of profile ladders include a plurality of profiles, wherein profiles in the plurality of profiles are associated with second values;
determining a plurality of second values that is associated with the plurality of profiles for each profile ladder in the plurality of profile ladders;
generating a first value that represents the bitrate or quality for profile ladders in the plurality of profile ladders, wherein the first value for a respective profile ladder is generated by combining the plurality of second values for profiles in the profile ladder into the first value;

selecting a profile ladder from the plurality of profile ladders based on a comparison of respective first values generated for the profile ladder and other profile ladders in the plurality of profile ladders; and using the profile ladder for the video.

* * * * *